US012526479B2

(12) United States Patent
Jiang

(10) Patent No.: US 12,526,479 B2
(45) Date of Patent: Jan. 13, 2026

(54) VIDEO RECOMMENDATION METHOD AND APPARATUS, ELECTRONIC DEVICE, AND COMPUTER-READABLE MEDIUM

(71) Applicant: BEIJING BYTEDANCE NETWORK TECHNOLOGY CO., LTD., Beijing (CN)

(72) Inventor: Chun Jiang, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 150 days.

(21) Appl. No.: 17/761,796

(22) PCT Filed: Aug. 18, 2020

(86) PCT No.: PCT/CN2020/109781
§ 371 (c)(1),
(2) Date: Mar. 18, 2022

(87) PCT Pub. No.: WO2021/052085
PCT Pub. Date: Mar. 25, 2021

(65) Prior Publication Data
US 2022/0394340 A1 Dec. 8, 2022

(30) Foreign Application Priority Data

Sep. 20, 2019 (CN) .......................... 201910893845.0

(51) Int. Cl.
*H04N 5/445* (2011.01)
*H04N 21/262* (2011.01)
(Continued)

(52) U.S. Cl.
CPC ... *H04N 21/4668* (2013.01); *H04N 21/26258* (2013.01); *H04N 21/4312* (2013.01); *H04N 21/4667* (2013.01); *H04N 21/4826* (2013.01)

(58) Field of Classification Search
CPC ......... H04N 21/4668; H04N 21/26258; H04N 21/4312; H04N 21/4667; H04N 21/4826;
(Continued)

(56) References Cited

U.S. PATENT DOCUMENTS 7,644,427 B1 * 1/2010 Horvitz ............... H04N 21/4662
725/9
9,414,101 B1 * 8/2016 Pereira ............... H04N 21/2393
(Continued)

FOREIGN PATENT DOCUMENTS

CN 104735477 A 6/2015
CN 106060637 A 10/2016
(Continued)

OTHER PUBLICATIONS

Notification to Grant Patent Right for Invention issued May 20, 2022 in Chinese Patent Application No. 201910893845.0 (1 page) with English translation (2 pages).
(Continued)

*Primary Examiner* — Annan Q Shang

(57) ABSTRACT

The present disclosure provides a video recommendation method and apparatus, an electronic device, and a computer-readable storage medium. The video recommendation method includes: transmitting a video obtaining request to a server in response to receiving a play trigger operation for target preview information in preview information displayed on a first display interface, the video obtaining request carrying identification information of a first video corresponding to the target preview information; receiving, from the server, the first video, a second video having a video similarity satisfying a first predetermined condition with the first video, and corresponding second video preview information; and playing the first video through a first region of a second display interface, and displaying a first predetermined number of pieces of preview information within the
(Continued)

second video preview information through a second region of the second display interface, the second display interface including the first region and the second region.

13 Claims, 6 Drawing Sheets

(51) Int. Cl.
  *H04N 21/431* (2011.01)
  *H04N 21/466* (2011.01)
  *H04N 21/482* (2011.01)
(58) Field of Classification Search
  CPC ............. H04N 21/2393; H04N 21/251; H04N 21/4316; H04N 21/6581; H04N 21/47202; H04N 21/23418
  See application file for complete search history.

(56) References Cited

U.S. PATENT DOCUMENTS

| | | | |
|---|---|---|---|
| 9,510,044 B1* | 11/2016 | Pereira | H04H 60/59 |
| 10,075,763 B2* | 9/2018 | Wilms | H04N 21/4756 |
| 10,244,286 B1* | 3/2019 | Jia | H04N 21/44224 |
| 10,349,090 B2 | 7/2019 | Mateik et al. | |
| 10,555,023 B1* | 2/2020 | McCarthy | H04N 21/8549 |
| 10,575,037 B2* | 2/2020 | Xie | H04N 21/44204 |
| 11,290,687 B1* | 3/2022 | Becchetti | H04N 7/15 |
| 2011/0179453 A1* | 7/2011 | Poniatowski | G06F 3/0482 |
| | | | 725/58 |
| 2011/0258155 A1* | 10/2011 | Akiyama | H04N 21/6582 |
| | | | 706/50 |
| 2015/0128197 A1* | 5/2015 | Lo | H04N 21/23116 |
| | | | 725/100 |
| 2015/0381682 A1* | 12/2015 | Rao | H04N 21/251 |
| | | | 709/219 |
| 2017/0034585 A1* | 2/2017 | Kim | H04N 21/4826 |
| 2017/0269804 A1 | 9/2017 | Richman et al. | |
| 2017/0311035 A1* | 10/2017 | Lewis | H04N 21/4826 |
| 2019/0379920 A1* | 12/2019 | Senapati | H04N 21/458 |
| 2020/0077135 A1* | 3/2020 | Niland | H04N 21/47202 |

FOREIGN PATENT DOCUMENTS

| | | |
|---|---|---|
| CN | 106231430 A | 12/2016 |
| CN | 107105349 A | 8/2017 |
| CN | 107968952 A | 4/2018 |
| CN | 108012162 A | 5/2018 |
| CN | 108307240 A | 7/2018 |
| CN | 109558500 A | 4/2019 |
| CN | 110012339 A | 7/2019 |
| CN | 110221765 A | 9/2019 |
| CN | 110519621 A | 11/2019 |
| WO | 2012011061 A2 | 1/2012 |

OTHER PUBLICATIONS

First Office Action issued Mar. 3, 2021 in Chinese Patent Application No. 201910893845.0 (9 pages) with an English translation (9 pages).

Second Office Action issued Nov. 3, 2021 n Chinese Patent Application No. 201910893845.0 (3 pages) with an English translation (5 pages).

* cited by examiner

VIDEO RECOMMENDATION METHOD AND APPARATUS, ELECTRONIC DEVICE, AND COMPUTER-READABLE MEDIUM

CROSS-REFERENCE TO RELATED APPLICATION

This application claims priority to Chinese Patent Application No. 201910893845.0, filed with China National Intellectual Property Administration on Sep. 20, 2019, the entire disclosure of which is incorporated herein by its reference.

TECHNICAL FIELD

The present disclosure relates to the field of computers, and more particularly, to a video recommendation method and apparatus, an electronic device, and a computer-readable medium.

BACKGROUND

Video display is usually divided into an outer stream and an inner stream. A video display interface of the outer stream (or called an outer stream display interface) displays a list of video covers. When a user clicks on a certain video cover, the user enters the inner stream, and a video content corresponding to the video cover starts to be played on a video display interface of the inner stream (or called an inner stream display interface). Users choose videos in which they are interested based on video covers on the video display interface of the outer stream, and thus videos having no characteristics in video covers but having high-quality contents cannot be pushed to the user in the inner stream if the users do not actively choose these videos.

SUMMARY

In a first aspect of the present disclosure, a video recommendation method is provided. The method includes: transmitting a video obtaining request to a server in response to receiving a play trigger operation for target preview information in at least one piece of preview information displayed on a first display interface, wherein the video obtaining request carries identification information of a first video corresponding to the target preview information; receiving, from the server, the first video, at least one second video each having a video similarity satisfying a first predetermined condition with the first video, and second video preview information corresponding to the at least one second video; and playing the first video through a first region of a second display interface, and displaying a first predetermined number of pieces of preview information within the second video preview information through a second region of the second display interface, wherein the second display interface includes the first region and the second region.

In a second aspect of the present disclosure, a video recommendation method is provided. The method includes: receiving a video obtaining request transmitted by a terminal device, wherein the video obtaining request is generated in response to a play trigger operation for target preview information in at least one piece of preview information displayed on a first display interface, and the video obtaining request carries identification information of a first video corresponding to the target preview information; determining, based on the identification information, at least one second video each having a video similarity satisfying a first predetermined condition with the first video; and transmitting the at least one second video and second video preview information corresponding to the at least one second video to the terminal device.

In a third aspect of the present disclosure, a video recommendation apparatus is provided. The apparatus includes: a transmitting module configured to transmit a video obtaining request to a server in response to receiving a play trigger operation for target preview information in at least one piece of preview information displayed on a first display interface, wherein the video obtaining request carries identification information of a first video corresponding to the target preview information; a first obtaining module configured to receive, from the server, the first video, at least one second video each having a video similarity satisfying a first predetermined condition with the first video, and second video preview information corresponding to the at least one second video; and a first video play module configured to play the first video through a first region of a second display interface, and display a first predetermined number of pieces of preview information within the second video preview information through a second region of the second display interface, wherein the second display interface includes the first region and the second region.

In a fourth aspect of the present disclosure, a video recommendation apparatus is provided. The apparatus includes: a first receiving module configured to receive a video obtaining request transmitted by a terminal device, wherein the video obtaining request is generated in response to a play trigger operation for target preview information in at least one piece of preview information displayed on a first display interface, and the video obtaining request carries identification information of a first video corresponding to the target preview information; a first determining module configured to determine, based on the identification information, at least one second video each having a video similarity satisfying a first predetermined condition with the first video; and a first transmitting module configured to transmit the at least one second video and second video preview information corresponding to the at least one second video to the terminal device.

In a fifth aspect of the present disclosure, an electronic device is provided. The electronic device includes a memory and a processor. The memory has a computer program stored thereon. The processor, when executing the computer program, implements the method in the first aspect or the second aspect.

In a sixth aspect of the present disclosure, a computer-readable medium is provided. The computer-readable medium has a computer program stored thereon. The computer program, when executed by a processor, implements the method in the first aspect or the second aspect.

Technical solutions provided by the present disclosure can bring the following advantageous effects.

The video obtaining request is transmitted to the server in response to receiving the play trigger operation for a target preview region corresponding to the first video on a first display interface, and the first video and the at least one second video each having the video similarity satisfying the first predetermined condition with the first video are received from the server. The first video is a video that meets a user's intention, and the second video similar to the first video also meets the user's intention. The first predetermined number of pieces of preview information within the second video preview information is displayed through the second region of the second display interface, such that the user can operate on the second video preview information on the second display interface to play the corresponding second video. It can be seen that in the present disclosure, there is no need to return to the first display interface (i.e., an outer stream display interface), and the second video that meets the user's intention can alternatively be played in the second display interface (i.e., an inner stream display interface), thereby shortening processing time taken for recommending videos that meet the user's intention to the user in the inner stream, and greatly improving operation convenience of the user. Also, since the present disclosure can ensure that videos recommended in the inner stream are videos that meet the user's intention, the accuracy of video push is improved. Further, in the present disclosure, the second display interface may actively push the second video to the user through without an operation initiated by the user, and may actively push videos having no characteristics in video covers to the user, thereby solving a problem that videos having no characteristics in video covers cannot be pushed to the user.

BRIEF DESCRIPTION OF DRAWINGS

The above and other features, advantages, and aspects of embodiments of the present disclosure will become more apparent in conjunction with the accompanying drawings and with reference to the following specific implementations. Throughout the accompanying drawings, the same or similar reference signs indicate the same or similar elements. It should be understood that the accompanying drawings are illustrative, and components and elements are not necessarily drawn to scale.

DESCRIPTION OF EMBODIMENTS

Figure 1:
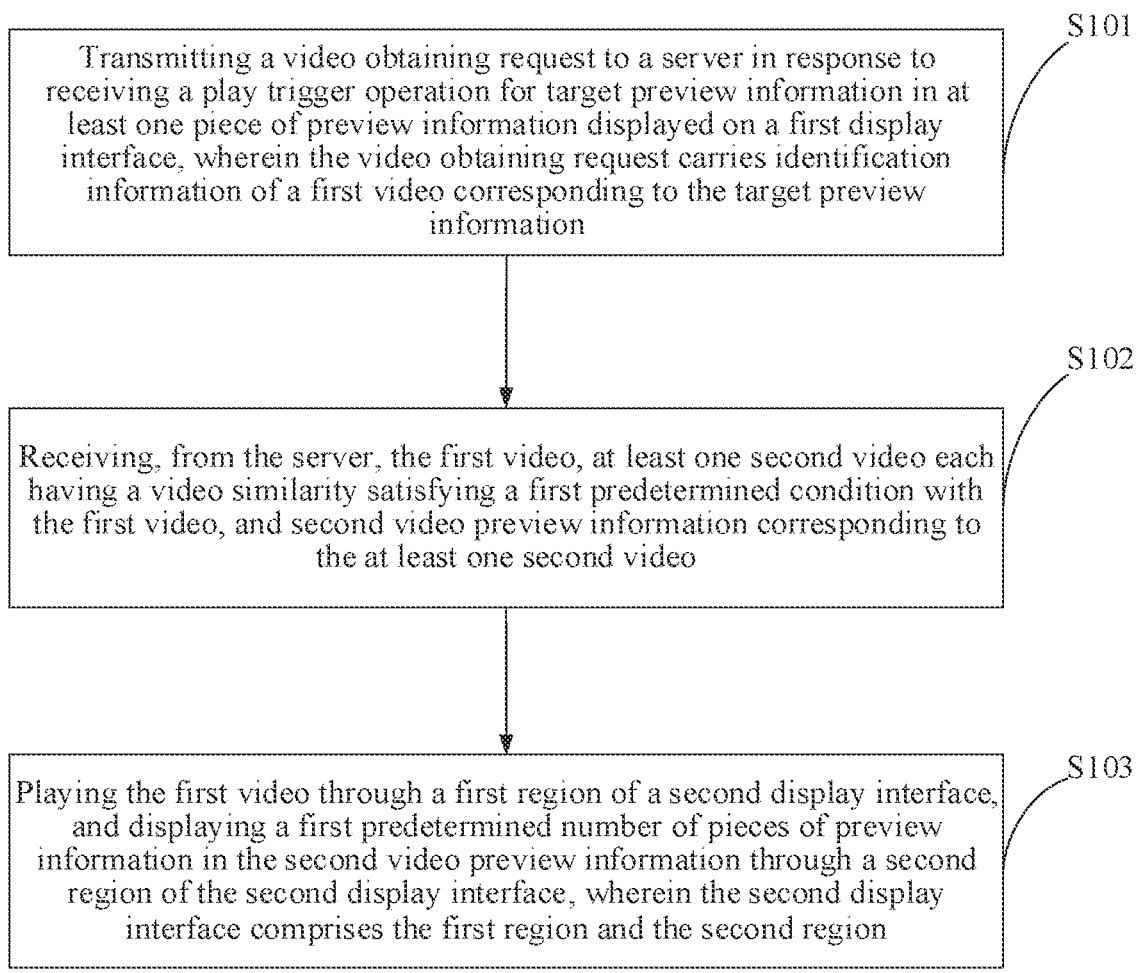
FIG. 1 is a schematic diagram showing an embodiment of a video recommendation method of the present disclosure.

Embodiments of the present disclosure will be described in more detail below with reference to the accompanying drawings. Although some embodiments of the present disclosure are shown in the drawings, it should be understood that the present disclosure can be implemented in various forms and should not be construed as being limited to the embodiments set forth herein. On the contrary, these embodiments are provided to facilitate a more thorough and complete understanding of the present disclosure. It should be understood that the accompanying drawings and embodiments of the present disclosure are only used for exemplary purposes, rather than to limit the protection scope of the present disclosure.

It should be understood that steps described in the method embodiments of the present disclosure may be executed in different sequences and/or in parallel. In addition, method implementations may include additional steps and/or omit executions of the illustrated steps. The scope of the present disclosure is not limited in this respect.

The term "include" and its variants as used herein indicate open-ended inclusions, i.e., "includes but not limited to". The term "based on" refers to "at least partially based on". The term "one embodiment" means "at least one embodiment"; the term "another embodiment" means "at least one additional embodiment"; and the term "some embodiments" means "at least some embodiments". Related definitions of other terms will be given in the following description.

It should be noted that concepts such as "first" and "second" mentioned in the present disclosure are only used to distinguish apparatuses, modules or units, and are neither used to limit that these apparatuses, modules or units are definitely different apparatuses, modules or units, nor used to limit a sequence or interdependence of functions performed by these apparatuses, modules or units.

It should be noted that modifications such as "a" and "plurality of" mentioned in the present disclosure are schematic instead of restrictive, and should be construed as "one or more" by those skilled in the art, unless otherwise clearly indicated in the context.

Names of messages or information exchanged between apparatuses in the embodiments of the present disclosure are only used for illustrative purposes, and are not intended to limit the scope of these messages or information.

In existing video recommendation schemes, a user selects a video in which he/she is interested based on a video cover, a video having no characteristics in the video cover thereof but having high-quality contents cannot be pushed to the user in an inner stream, unless the user actively selects the video. Also, after watching a certain inner stream video, the user needs to exit to an outer stream display interface for another selection to watch a next video he/she wants to watch. In this way, the terminal can only recommend videos that meet a user's intention in the inner stream based on user operations, thereby resulting in complicated user operations and increasing the complexity of pushing a user desired video to the user in the inner stream.

The technical solutions of the present disclosure and how the technical solutions of the present disclosure solve the above technical problems will be described in detail below with specific embodiments. The following specific embodiments can be combined with each other, and the same or similar concepts or processes may not be repeated in some embodiments. The embodiments of the present disclosure will be described below with reference to the accompanying drawings.

First, it should be noted that videos (including a first video, a second video, a third video, a fourth video, and a fifth video) in the present disclosure may be videos in a feed video stream. The feed video stream is a video stream formed by video contents published on a network platform (which can be a server) by several information sources that are subscribed by the user. In a feed scenario, an information source can be a friend or a subject of concern, and a video content is an update (a published video content) of a friend or a subject of concern; and alternatively, the information source can be other users matching a user portrait, a content from the matching information source can be pushed to the user, and the user can receive a steady stream of video contents when he/she has enough friends or when his/her friends post updates frequently enough.

An outer stream in the present disclosure refers to a feed video stream that only pushes video preview information rather than directly pushes videos to the user.

Correspondingly, the outer stream display interface displays video covers, lists, or posters. When the user wants to watch a video, he/she needs to enter an inner stream. The inner stream in the present disclosure refers to a feed video stream that directly pushes videos to the user. Correspondingly, an inner stream display interface directly plays videos to the user. For example, upon clicking on a certain piece of preview information of a video in the outer stream display interface, the user enters the inner stream, and the video is played in the inner stream display interface.

Referring to FIG. 1, the present disclosure provides a video recommendation method. The method may be specifically executed by an electronic device. The electronic device may be a terminal device. The terminal device may be a desktop device or a mobile terminal. The present disclosure includes the following steps.

In step S101, in response to receiving a play trigger operation for target preview information in at least one piece of preview information displayed on a first display interface, a video obtaining request is transmitted to a server, where the video obtaining request carries identification information of a first video corresponding to the target preview information.

The first display interface of the terminal device is divided into at least one preview information display region, and each of the at least one preview information display region displays one piece of preview information, such that at least one piece of preview information is displayed on the first display interface of the terminal device. The at least one preview information display region can have different sizes. Preview information can be preview information of any one of a video, an audio, a text, a picture, or an animated image. When the preview information is video preview information, the video preview information refers to the above-mentioned video covers, lists, or posters.

The first display interface is the outer stream display interface described above. The terminal device transmits a video obtaining request to a server in response to receiving from the user a play trigger operation for target preview information in at least one piece of preview information displayed on the first display interface. The play trigger operation may be a click operation of the user on the target preview information, the video obtaining request carries the identification information of a first video corresponding to the target preview information, and the identification information of the first video can uniquely identify the first video.

In step S102, the first video, at least one second video each having a video similarity satisfying a first predetermined condition with the first video, and second video preview information corresponding to the at least one second video are received from the server.

The outer stream display interface can select recommended videos based on real-time video clouts. The real-time video clout is determined by at least one of a real-time clicking (or browsing) amount, a real-time forwarding amount, or a real-time sharing amount of a video. Videos recommended in the inner stream display interface are determined based on the user's intention, and based on a video selected by the user, similar videos can be determined as a desired video of the user.

Specifically, after determining a first video based on identification information of the first video, the server can transmit the first video to a video recommendation model of the server. The video recommendation model has a function of learning videos in which the user is interested. The video recommendation model can determine at least one second video each having a video similarity satisfying a first predetermined condition with the first video, and the first predetermined condition is predetermined by the server. The server transmits, to the terminal device, the first video, the at least one second video, and second video preview information corresponding to the at least one second video. The second video preview information includes video preview information corresponding to each second video.

The video similarity can be used to measure a degree of similarity (or correlation) between video contents of two videos. For example, when two videos are both videos of a method of cutting watermelons, the similarity is relatively high; and when one video is a sports video while another video is a film and television video, the similarity is relatively low. The first video is actively selected by the user and meets the user's intention, and the second video similar to the first video also meets the user's intention to a great extent.

Further, from a perspective of user experience, the at least one second video similar to the first video has a limited number. That is, after the server determines the second videos, a predetermined number of second videos are selected and transmitted to the terminal device. In this case, after transmitting the at least one second video similar to the first video to the terminal device, the server can then transmit a personalized video to the terminal device. The personalized video refers to a video which may be of interest to the user and is determined based on a history record of videos watched by the user. The personalized video may be of a different type from the second video similar to the first video. For example, the first video is a film and television video, the second video similar to the first video is also a film and television video, it is found based on a history record of videos watched by the user that the user often watches sports videos, and the server may transmit sports videos to the terminal device immediately after transmitting a predetermined number of film and television videos to the terminal device, such that the terminal device can push the received videos to the user.

In step S103, the first video is played through a first region of a second display interface, and a first predetermined number of pieces of preview information within the second video preview information are displayed through a second region of the second display interface, where the second display interface includes the first region and the second region.

The terminal device can only play one video within a period of time. That is, the terminal device cannot play two videos simultaneously. The second display interface of the terminal device is divided into the first region and the second region. The first region is a video play region, and the second region is a display region of the video preview information. The video play region and the display region are not fixed. Positions occupied by the first region and the second region on the second display interface are not limited. The second region can be divided into a plurality of small regions for display of a plurality of pieces of video preview information. When a video is played in the first region, the second region displays a list, a cover, or a poster of the video to the user.

For example, after receiving from the server the first video, the at least one second video, and the second video preview information corresponding to the at least one second video, the terminal device caches the at least one second video, plays the first video through the first region of the second display interface, and displays the first predetermined number of pieces of preview information within the second video preview information through the second region of the second display interface. The first predetermined number is predetermined by the terminal device. When the user performs a sliding operation on the second display interface of the terminal device, the played video and the displayed video preview information in the second display interface can be changed, thereby playing the second video. As described above, when the terminal device further receives the personalized video, the second display interface also needs to push the personalized video to the user after pushing the second video to the user.

For an existing user, a conventional video recommendation model is trained based on a record of videos watched by the user over a period of time to determine videos of interest to the user. In this way, a speed of the model learning is relatively slow. In the solutions of the present disclosure, based on the first video actively selected by the user, the video recommendation model can quickly learn the second video in which the user is interested, such that a speed of the model learning is relatively fast. The solutions of the embodiments of the present disclosure are more effective for new users. For a new user, since there is no history record of videos watched by the new user, it is impossible to know which type of videos the new user is interested in, and videos can only be recommended to the new user based on real-time video clouts of the videos. With the solutions of the present disclosure, it is possible to quickly obtain which types of videos the new user is interested in, and thus it is unnecessary to determine videos that the new user is interested in based on a history record of videos watched by the user.

When the play trigger operation for a target preview region corresponding to the first video on a first display interface is received, the video obtaining request is transmitted to the server, and the first video and the at least one second video each having a video similarity satisfying the first predetermined condition with the first video that are received from the server. The first video is a video that meets the user's intention, and the second video similar to the first video also meets the user's intention. The first predetermined number of pieces of preview information within the second video preview information is displayed through the second region of the second display interface, such that the user can operate on the second video preview information on the second display interface to play the corresponding second video. It can be seen that in the present disclosure, there is no need to return to the first display interface (i.e., the outer stream display interface), and the second video that meets the user's intention can be played in the second display interface (i.e., the inner stream display interface), thereby shortening processing time taken for recommending videos that meet the user's intention to the user in the inner stream. Also, since the present disclosure can ensure that videos recommended in the inner stream are videos that meet the user's intention, the accuracy of video push is improved. Further, the present disclosure can actively push the second video to the user through the second display interface without an operation initiated by the user, and can actively push videos having no characteristics in covers of the videos to the user, thereby solving a problem that videos having no characteristics in covers of the video cannot be pushed to the user.

In the embodiments of the present disclosure, after the server determines the at least one second video, the at least one second video further needs to be ranked before being transmitted to the terminal device. A method for determining the at least one second video and a ranking process of the at least one second video will be described below in detail. The method for determining the at least one second video is described below first.

According to an embodiment of the present disclosure, determining, based on the identification information, the at least one second video each having the video similarity satisfying the first predetermined condition with the first video includes: determining the first video based on the identification information; calculating, based on coordinates in a similarity algorithm model of the first video and respective videos in a pre-stored video database, video similarities between the first video and the respective videos; and determining from the pre-stored video database, based on the video similarities, the at least one second video each having the video similarity satisfying the first predetermined condition with the first video.

In this embodiment, a distance between positions of two videos in the similarity algorithm model can be used to characterize a video similarity between the two videos. That is, a calculated distance value between the two videos is a similarity value of the two videos, and the distance value can be normalized to [0,1], where 0 indicates that the two videos are farthest distanced from each other and accordingly, the two videos have a lowest similarity, and 1 indicates that the two videos are nearest distanced from each other and accordingly, the two videos have a highest similarity. Specifically, a specific method for the server to determine the at least one second video each having the video similarity satisfying the first predetermined condition with the first video is described below.

The server contains the similarity algorithm model that can be used as a functional module of the server. The similarity algorithm model and the video recommendation model can be the same model. Also, the video database pre-stored in the server has a large number of videos stored therein. Each video of the large number of videos and the first video corresponds to coordinates of one point in the similarity algorithm model (usually coordinates of a point of a two-dimensional coordinate system). The server determines the coordinates, in the similarity algorithm model, of the first video and the coordinates, in the similarity algorithm model, of each video in the pre-stored video database. For a video in the video database, a method for calculating the video similarity includes calculating a cosine similarity between the coordinates of the video and the coordinates of the first video, and determining the cosine similarity as the video similarity between the video and the first video. In this manner, video similarities between respective videos in the pre-stored video database and the first video can be determined individually, such that videos in the video database, which have the video similarity satisfying the first predetermined condition, are determined as the second videos.

Usually, when the distance value between two videos is within a range of [0.7, 0.8], it is determined that the video similarity between the two videos satisfies the first predetermined condition. In a possible case, the first predetermined condition is determined as [0.5, 0.8] first, and the at least one second video is determined based on [0.5, 0.8] and then recommended to the user in the inner stream, thereby exploring whether the user is really interested in the at least one second video for further adjusting the value range of the first predetermined condition, thereby finally finding a value range capable of ensuring that the at least one second video determined based on the value range is at least one video that the user is really interested in.

For example, the coordinates of the first video are (X1, Y1), and the coordinates of a certain video in the video database are (X2, Y2). The cosine similarity between the coordinates of the two videos is calculated. When a calculation result ranges from 0.7 to 0.8, it is determined that the video satisfies the first predetermined condition, and thus the video is the second video.

Further, the at least one second video may be at least two second videos, and the at least two second videos are ranked by the following manner.

Optionally, transmitting the at least one second video and the second video preview information corresponding to the at least one second video to the terminal device includes: transmitting to the terminal device the at least two second videos that are ranked based on a video type preference of a user and second video preview information corresponding to the at least two second videos, where the video type preference of the user is determined based on at least one of attribute information of the user or a history record of videos watched by the user.

In this embodiment, after determining the at least two second videos, the server may rank the at least two second videos based on a preference of the user in a personalized manner. The preference of the user is determined based on at least one of the attribute information of the user or the history record of videos watched by the user. The preference of the user can alternatively be determined based on other factors, which is not limited herein.

The attribute information of the user can be at least one of the gender, age, or occupation of the user. For example, when the user is female, the film and television video of the at least two second videos can be ranked in the front of the at least two second videos, and when the user is male, the sports video and the game video of the at least two second videos can be ranked in the front of the at least two second videos. The history record of videos watched by the user can be at least one of: time lengths for the user watching the videos, completion degrees of the user watching the videos, or types of videos that the user watched more in history. The type of videos that the user watched more in history may be a video type the number of videos of which watched by the user is greater than a threshold. For example, when the completion degree of watching of a certain video of the user is higher than a certain percentage, and the video is a car advertisement video, a video belonging to a car advertisement category of the at least two second videos can be ranked in the front of the at least two second videos; when the time length the user watched a certain video is longer than a certain time length threshold, and the video is a dance video, a video belonging to a dance category of the at least two second videos can be ranked in the front of the at least two second videos; and when the user often watches the film and television videos, a video belonging to a film and television category of the at least two second videos can be ranked in the front of the at least two second videos.

The server ranks, based on a ranking order of the at least two second videos, the video preview information corresponding to the at least two second videos, and transmits the ranked at least two second videos and the second video preview information corresponding to the ranked at least two second videos to the terminal device. For example, the terminal device caches the at least two second videos, and displays, based on a ranking result, the first predetermined number of pieces of preview information within the second video preview information on the second display interface.

In this embodiment, the server can rank the at least two second videos based on the preference of the user, and display, based on the ranking result, the video preview information on the second display interface, such that a second video that better satisfies the preference of the user can be more easily watched by the user.

Optionally, the method further includes, subsequent to transmitting the at least one second video and the second video preview information corresponding to the at least one second video to the terminal device; obtaining a time length of the user watching the at least one second video; and determining a sum of the time length of the user watching the at least one second video and a time length of the user watching the first video as a watching time length of the first video, a ranking result of videos of a same video type as the first video being determined based on the watching time length.

For example, the interest of the user in videos of a video type to which a certain video belongs increases as a time length of playing of the video increases. The user clicks on the first video to enter the second display interface, and plays the at least one second video in the second display interface. The time length of the user watching the at least one second video in the second display interface can be added to the time length of the user watching the first video. When the server ranks, based on a history watching time length of a video, videos of a video type to which the video belongs, videos belonging to the same video type as the video are more likely to be ranked ahead. For example, when the user enters an inner stream play interface by clicking on preview information of a certain dance video, time lengths of all videos played by the user in the inner stream display interface are added to a play time length of the dance video, until the user exits to the outer stream display interface. Consequently, when videos of a video type are ranked based on a video play time length of a video of the video type, videos belonging to the dance category are more likely to be ranked ahead.

Optionally, the watching time length and the completion degree of watching of the user not only can be used to rank videos, but also can be used to improve the accuracy of determining whether a selected video is a video that the user is really interested in. For example, when the user enters the inner stream but exits to the outer stream after watching a video for a few seconds, it may indicate that the user is not really interested in the video. On this basis, the first video in the present disclosure can be defined as a video having a watching time length of the user after entering an inner stream play interface longer than a threshold time length. That is, the first video is a video that the user is really interested in.

Further, after receiving the ranked at least two second videos, the terminal device can play, in a portrait mode, candidate inner stream videos (in this case, the candidate inner stream videos are at least two second videos) in the second display interface, or play, in a full-screen landscape mode, a candidate internal stream video (in this case, the candidate inner stream video is obtained by further screening from the at least two second videos) in a third display interface. Both the second display interface and the third display interface are inner stream display interfaces.

Specifically, a manner for playing, in the portrait mode, the candidate inner stream videos in the second display interface is introduced first.

Optionally, the at least one second video is at least two second videos, and the method further includes, subsequent to displaying the first predetermined number of pieces of preview information within the second video preview information through the second region of the second display interface: in response to receiving a sliding operation of the user on the second display interface in a portrait direction, determining a fifth video from the at least two second videos, and determining a second predetermined number of pieces of preview information from the second video preview information; and playing the fifth video through the first region of the second display interface, and displaying the second predetermined number of pieces of preview information through the second region of the second display interface.

For example, the at least two second videos and the second video preview information corresponding to the at least two second videos, which are received by the terminal device, have been ranked. In response to receiving the sliding operation of the user on the second display interface in a portrait direction of the display interface, the terminal device gradually displays to the user, based on the ranking result, the video preview information of the at least two second videos that have not been displayed. That is, the user can update the video preview information of the at least two second videos displayed in the second display interface by performing the sliding operation. When the sliding operation stops, the terminal device determines from the at least two second videos the fifth video that the user wants to play. A determination criterion is that: during a sliding process of the user, when the video preview information of a certain second video is fully displayed to the user, or the video preview information of a certain second video is completely displayed on the second display interface, the second video is determined as the fifth video, and then the terminal device plays the fifth video in the first region of the second display interface; and during the sliding process, when the video preview information of two second videos is fully displayed to the user, one second video having a higher ranking priority among the two second videos is determined as the fifth video and played.

Also, when the sliding operation stops, the terminal device displays the second predetermined number of pieces of preview information to the user in the second region of the second display interface. The second predetermined number is predetermined by the terminal device. In this case, preview information displayed in the second region can be only a part of the preview information. That is, the user can only see a part of the video cover (or the poster, or the list).

The present disclosure can be applied to push of video streams in a feed scenario. An implementation process of playing the candidate inner stream videos in the portrait mode according to the present disclosure is described below in conjunction with FIG. 2.

The terminal device displays preview information of a feed stream video 1, preview information of a feed stream video 2, preview information of a news article 1, and preview information of a news article 2 on the outer stream display interface. When the user clicks on the preview information of the feed stream video 1, the terminal device transmits a user request to the server, and the server determines videos having a video similarity satisfying a predetermined condition to the feed stream video 1 and adds the videos to a candidate inner stream video set (that is, at least two second videos). Videos in the candidate inner stream video set are also feed stream videos. The server transmits to the terminal device the candidate inner stream video set that has been ranked and video preview information corresponding to the ranked candidate inner stream video set, and transmits the feed stream video 1 to the terminal device in response to the user request.

Figure 2:
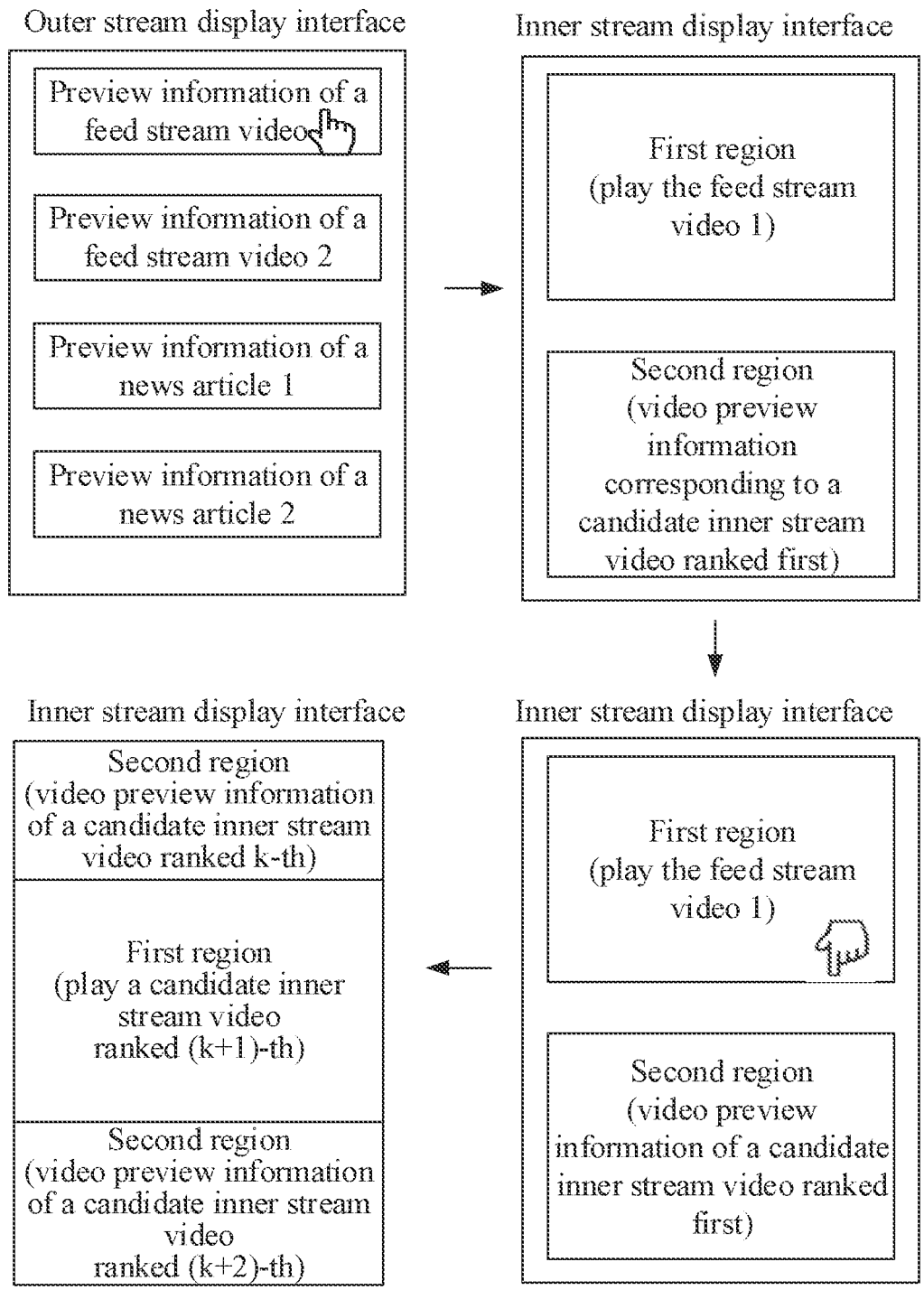
FIG. 2 is a schematic diagram showing a scenario of a video recommendation method of the present disclosure.

The terminal device switches to the inner stream display interface, and plays the feed stream video 1 in the first region of the inner stream display interface. Also, due to a limited region of the inner stream display interface, the terminal device displays, in the second region of the inner stream display interface, video preview information corresponding to a candidate inner stream video ranked first in candidate inner stream video set. The user can slide downwards on the inner stream display interface to update the preview information of the candidate inner stream videos pushed on the inner stream display interface. When preview information of a certain candidate inner stream video is fully displayed on the inner stream display interface, then the candidate inner stream video can be played. As illustrated in FIG. 2, after sliding of the user, positions of the first region and the second region changed. The second region in the inner stream display interface is divided into two small regions that may be of different sizes, and the first region is greater than each small region. One small region displays a part of video preview information of a candidate inner stream video ranked k-th, the first region plays a candidate inner stream video ranked (k+1)-th (that is, the fifth video), and the other small region displays a part of video preview information of a candidate inner stream video ranked (k+2)-th.

In the embodiments, by performing the sliding operation in the second display interface, the user updates the video preview information displayed in the second display interface while playing the fifth video, such that even if the user does not exit from the inner stream display interface, the fifth video that the user may be interested in can be played in the inner stream display interface, thereby ensuring that videos recommended in the inner stream are videos that meet the user's intention and improving the accuracy of video push. Also, it is unnecessary for the user to exit from the inner stream display interface, which reduces the complexity of recommending desired videos to the user in the inner stream.

Secondly, a manner for playing the candidate inner stream videos in the third display interface in the landscape mode is introduced.

Compared with the second video described above, the candidate inner stream videos played in the landscape mode further considers a landscape play scenario. Similarly, the candidate inner stream videos played in the landscape mode have also been ranked. Before introducing the manner for playing the candidate inner stream videos in the landscape mode, methods for determining and ranking the candidate inner stream videos for play in the landscape mode will be explained separately.

The manner for determining the candidate inner stream videos for play in the landscape mode is described below.

Optionally, the method further includes, subsequent to playing the first video through the first region of the second display interface: playing, in response to receiving a landscape display trigger operation for the first video, the first video through a third display interface in a full-screen landscape mode; and obtaining at least one third video satisfying a landscape play condition.

Optionally, obtaining the at least one third video satisfying the landscape play condition includes at least one of: determining the at least one third video satisfying the landscape play condition by screening from the obtained at least one second video; or transmitting landscape play prompt information to the server, and receiving the at least one third video satisfying the landscape play condition, the at least one third video satisfying the landscape play condition being determined by the server screening from all of the at least one second video based on the landscape play prompt information. The at least one third video satisfying the landscape play condition includes at least one of: a video having a video size ratio satisfying a predetermined landscape play size ratio; a video of a video type suitable for landscape play; or a video determined based on a history record of at least one video played in a landscape mode and watched by at least one user. Herein, the history record of at least one video played in the landscape mode includes at least one of: a time length for playing the at least one video in the landscape mode, a completion degree of playing the at least one video in the landscape mode, an operation of sliding to a landscape play interface of a next video in a landscape play mode, or a landscape display trigger operation on the at least one video.

The first video played in the first region of the second display interface is played in the portrait mode. The user can perform the landscape display trigger operation on the first video, and then the terminal device can play the first video through the third display interface in the full-screen landscape mode. The third display interface is also an inner stream display interface, and the landscape display trigger operation can be a click operation of the user on a video landscape identifier.

In this case, depending on different play scenarios, videos recommended by the inner stream are different. The terminal device can obtain the at least one third video satisfying the landscape play condition, and recommend the at least one third video to the user on the third display interface.

Specifically, the terminal device may determine the at least one third video satisfying the landscape play condition by screening from all of the at least one second video obtained in the step S102; or the terminal device may generate the landscape play prompt information in response to the landscape display trigger operation after receiving the landscape display trigger operation, the landscape play prompt information being information used to prompt the server that the user wants to watch a video in the landscape mode, and the terminal device transmits the landscape play prompt information to the server, and receives the at least one third video satisfying the landscape play condition, the at least one third video satisfying the landscape play condition being determined by the server based on the landscape play prompt information through screening from all of the at least one second video determined in the step S102.

In such an implementation, the at least one third video satisfying the landscape play condition includes at least one of the following types.

Since a play region of videos is generally a rectangular box, the third video can be a video having a video size ratio satisfying the predetermined landscape play size ratio. Generally, the third video is a video a length-to-width ratio of which is a positive number smaller that than 1. That is, the width is greater than the length in the video size.

Since play effects of videos of some video types in landscape play scenarios are better than that in portrait play scenarios, the third video can be a video of such video types suitable for landscape play, such as sports videos, film and television videos, etc.

The third video may alternatively be a video determined based on a history record of at least one video played in the landscape mode and watched by at least one user. The history record of at least one video played in the landscape mode is a related record of at least one video watched by the user in the landscape mode in the history. The related record may specifically be the time length for playing the at least one video in the landscape mode, the completion degree of playing the at least one video in the landscape mode, an operation of the user sliding to the landscape play interface of the next video in the landscape play mode, or the landscape display trigger operation of the user on the at least one video.

Regarding the time lengths for playing the videos in the landscape mode, the suitability for playing videos of a video type to which a certain video belongs in the landscape mode increases as a time length for playing the video in the landscape mode increases. For example, when a time length of the user watching a certain video is longer than a certain time length threshold, and the video is a dance video, it means that the user is more likely to choose the landscape mode when playing dance videos.

Regarding the completion degrees of playing of the videos in the landscape mode, the suitability for playing videos of a video type to which a certain video belongs in the landscape mode increases as a completion degree of playing of the video in the landscape mode increases. The completion degree of watching of a certain video in the landscape mode is a percentage of a content of the video that has been watched in the landscape mode. For example, when the completion degree of a user watching a certain video is higher than a certain percentage, and the video is a car advertisement video, it means that the user is more likely to choose the landscape mode when playing car videos.

The operation of the user sliding to the landscape play interface of the next video in the landscape play mode is for example a case where a current video play mode is the landscape play mode, and the user performs the sliding operation in the landscape play mode so that the user can slide to the landscape play interface of the next video and continue to play the next video. When the user continues updating videos in the landscape play mode without exiting from the landscape play interface, it means that the user wants to continue to watch the next video in the landscape mode, and thus the operation of sliding to the video play interface of the next video can also be used as a history record of landscape play. The landscape display trigger operation of the user on the video is for example a click operation of the user on a landscape identifier of the third video, and when the user often slides for paly of a certain type of videos in the landscape play mode or the user often performs the landscape display trigger operation for a certain type of videos, it means that the user is more likely to play this type of videos in the landscape mode.

In the embodiments, further determining the at least one third video from all of the at least one second video can ensure that the obtained video recommended in the inner stream is more in line with landscape play scenarios.

The manner for ranking the candidate inner stream videos for play in the landscape mode is described below.

Optionally, the at least one third video is at least two third videos, and transmitting the at least one third video to the terminal device includes: transmitting to the terminal device the at least two third videos that has been ranked based on a video type preference of the user, the video type preference of the user being determined based on at least one of attribute information of the user or a history record of at least one video watched by the user; and the method further includes, subsequent to transmitting the at least one third video to the terminal device; obtaining a time length of the user watching the at least two third video; and determining a sum of the time length of the user watching the at least two third video and a time length of the user watching the first video as a watching time length of the first video to determine, based on the watching time length and when ranking the at least two third video based on the video type preference of the user, a ranking result of videos of a same video type as the first video.

After the at least two third videos suitable for the landscape play mode are obtained, the at least two third videos can be ranked, such that the at least two third videos can be sequentially pushed in the third display interface based on the ranking result. As for the method for ranking the at least two third videos, reference can be made to the above method for ranking the at least two second videos, details of which are not elaborated here. Similarly, after the user enters the inner stream from the first video, time lengths of all videos played in the third display interface in the landscape mode can be added to the time length for playing the first video, and a specific implementation process may be referred to the relevant discussion described above, and is not elaborated here.

As described above, after the candidate inner stream videos for play in the landscape mode are determined and ranked, the manner for playing the candidate inner stream videos in the landscape mode can be described as follows.

Optionally, the method further includes, subsequent to obtaining the at least one third video satisfying the landscape play condition: determining a fourth video from the at least one third video in response to receiving a sliding operation of a user on the third display interface in a landscape direction; and playing the fourth video through the third display interface in a full-screen landscape mode.

As described above, the at least one third video received by the terminal device is at least one third video that has been ranked. The third display interface of the terminal device plays the first video in the full-screen landscape mode. The user can perform the sliding operation on the third display interface in the landscape direction to update a video played in the third display interface. Every time the sliding operation is performed, the video pushed in the third display interface is updated once. When the sliding operation stops, the terminal device determines the fourth video from the at least two third videos based on the ranking result, and plays the fourth video through the third display interface in the full-screen landscape mode. It can be seen that the terminal device can push, based on the sliding operation of the user, the at least two third videos to the user sequentially in accordance with the ranking result.

Figure 3:
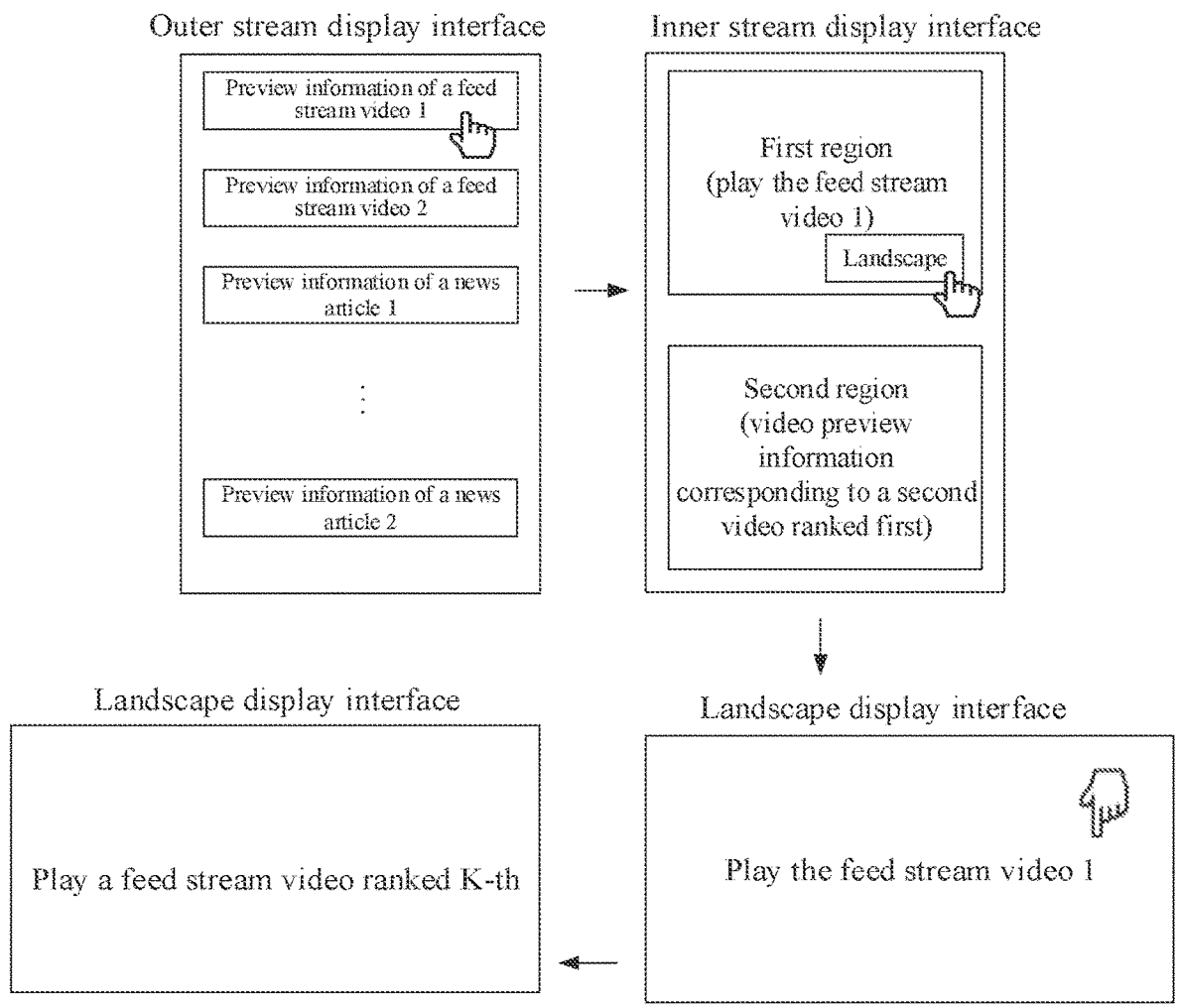
FIG. 3 is a schematic diagram showing another scenario of a video recommendation method of the present disclosure.

The present disclosure can be applied to push of video streams in a feed scenario. An implementation process of playing the candidate inner stream videos in the landscape mode of the present disclosure is described below in conjunction with FIG. 3.

The terminal device displays the preview information of the feed stream video 1, the preview information of the feed stream video 2, the preview information of the news article 1, and the preview information of the news article 2 on the outer stream display interface. When the user clicks on the preview information of the feed stream video 1, the terminal device transmits a user request to the server, the server determines videos each having a video similarity satisfying a predetermined condition to the feed stream video 1 and adds the videos to the at least two second videos, the server returns to the terminal device the feed stream video 1, the at least two second videos, and preview information corresponding to the at least two second videos, the terminal device switches to the inner stream display interface, and plays the feed stream video 1 in the first region of the inner stream display interface, and due to a limited region of the inner stream display interface, the terminal device displays, in the second region of the inner stream display interface, video preview information corresponding to a second video ranked first in the at least two second videos.

The user clicks on a landscape play identifier of the feed stream video 1 to switch to the landscape display interface (i.e., the third display interface), and continues playing the feed stream video 1 on the landscape display interface. The server or the terminal device determines, from the at least two second videos, videos suitable for play in the landscape mode as a set of candidate inner stream videos (i.e., at least two third videos), and ranks the candidate inner stream videos. Videos in the set of candidate inner stream videos are also feed stream videos. The user may slide downwards on the landscape display interface in the landscape direction to update the candidate inner stream video pushed on the landscape display interface. Every time the sliding operation is performed, the feed stream video played on the landscape display interface is updated once. As illustrated in the figure, after k times of sliding, the landscape display interface starts to play a feed stream video that is ranked k-th.

In the embodiments, the user can update the third video played in the third display interface by performing the sliding operation on the third display interface. Therefore, even if the user has not exited from the inner stream display interface, the third video in which the user may be interested can be played in the inner stream display interface. In this way, it is unnecessary for the user to exit from the inner stream display interface while a desired video of the user is recommended to the user, thereby reducing the complexity of recommending the desired video to the user in the inner stream. Also, since videos recommended in the inner stream take specific landscape play scenarios into consideration, play experience of the user is enhanced.

Further, duplicate videos in videos recommended on the inner stream display interface and videos recommended on the outer stream display interface need to be eliminated.

According to the embodiments of the present disclosure, the method further includes, subsequent to transmitting the at least one second video and the second video preview information corresponding to the at least one second video to the terminal device: determining, from videos corresponding to respective pieces of preview information that are displayed on the first display interface, a video that has not been played on the second display interface; and transmitting the video that has not been played to the terminal device.

The videos the video preview information of which the terminal device has displayed on the first display interface are videos that have been recommended on the outer stream display interface, and many of these videos are high-quality videos obtained through screening by the server. When the user has not watched a video, i.e., the video has not been played on the second display interface or the third display interface, the video that has been recommended by the outer stream display interface can continue to be recommended in the inner stream display interface (that is, the video can be determined as the second video or the third video and recommended to the user). Within a first predetermined time length, a video that has been selected by the user and played in the outer stream display interface is not further recommended in the inner stream display interface (that is, the video will not be determined as a second video or a third video to be recommended to the user); and a video that has been played in the inner stream display interface will not be further recommended in the outer stream display interface within a second predetermined time length. The first predetermined time length can be the same as or different from the second predetermined time length.

Videos that are automatically played without covers, such as the videos played in the landscape mode, are all applicable to the de-duplication strategy as described above.

In the embodiments, videos recommended in the inner stream and videos recommended in the outer stream are de-duplicated mutually to avoid recommending videos that have been watched by the user. In this case, the second display interface directly displays a video content that has little relevance to video covers, such that high-quality-content videos that have not been displayed on the outer stream display interface can be brought to the inner stream display interface for further recommendation. In this way, on the premise of ensuring that videos recommended in the inner stream meet the user's intention, video having high-quality contents but no characteristics in covers of the videos can be pushed to the user.

Figure 4:
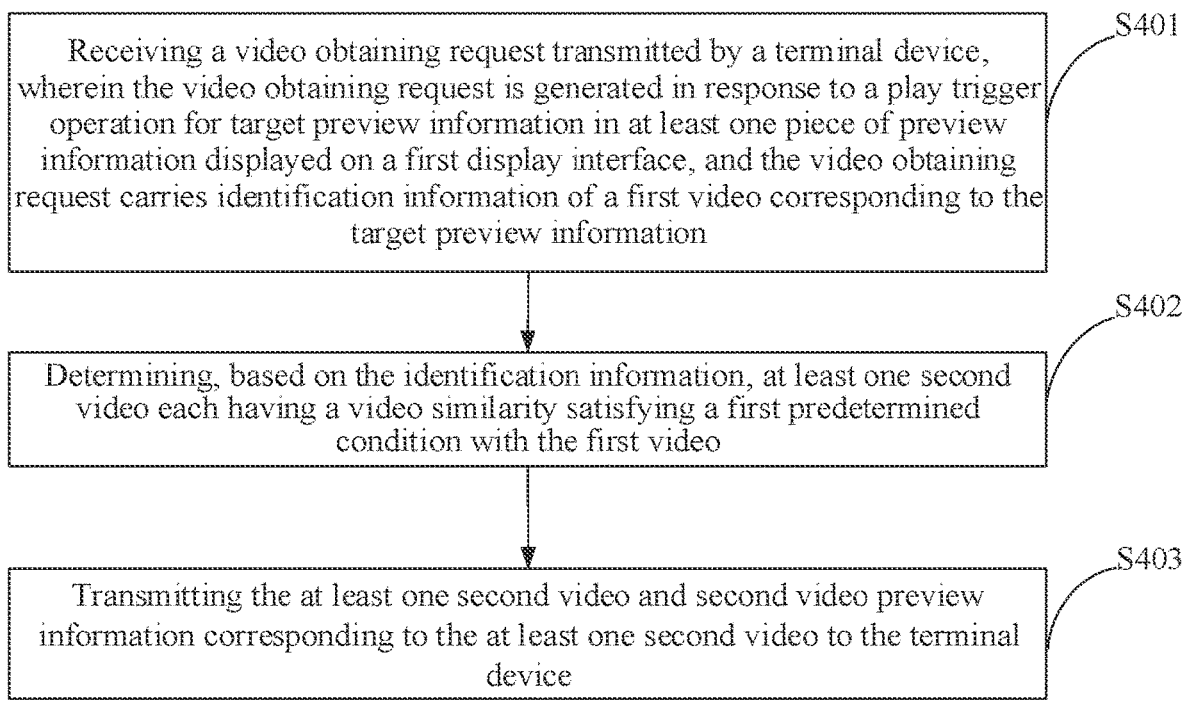
FIG. 4 is a schematic diagram showing another embodiment of a video recommendation method of the present disclosure.

The present disclosure is described above from a perspective of the terminal device, and the present disclosure will be described below from a perspective of the server. As illustrated in FIG. 4, the present disclosure provides a video recommendation method. The method can be specifically executed by an electronic device. The electronic device can be the server. Specifically, the method includes the following steps.

In step S401, a video obtaining request transmitted by a terminal device is received, wherein the video obtaining request is generated in response to a play trigger operation for target preview information in at least one piece of preview information displayed on a first display interface, and the video obtaining request carries identification information of a first video corresponding to the target preview information.

In step S402, at least one second video each having a video similarity satisfying a first predetermined condition with the first video is determined based on the identification information.

In step S403, the at least one second video and second video preview information corresponding to the at least one second video are transmitted to the terminal device.

According to the embodiment of the present disclosure, the method further includes, subsequent to receiving the video obtaining request transmitted by the terminal device: determining the first video based on the identification information in the video obtaining request, and transmitting the first video to the terminal device; receiving landscape play prompt information transmitted by the terminal device, wherein the landscape play prompt information is generated by the terminal device in response to a landscape display trigger operation of a user on the first video; determining at least one third video satisfying a landscape play condition from the at least one second video based on the landscape play prompt information; and transmitting the at least one third video to the terminal device. The at least one third video satisfying the landscape play condition includes at least one of: a video having a video size ratio satisfying a predetermined landscape play size ratio; a video of a video type suitable for landscape play; or a video determined based on a history record of at least one video played in a landscape mode and watched by at least one user, wherein the history record of at least one video played in the landscape mode includes at least one of: a time length for playing the at least one video in the landscape mode, a completion degree of playing the at least one video in the landscape mode, an operation of sliding to a landscape play interface of a next video in a landscape play mode, or a landscape display trigger operation on the at least one video.

It should be noted that the method illustrated in these embodiments is essentially the same technical solution as the method illustrated in FIG. 1, except that the method illustrated in FIG. 1 is described with the terminal device as an execution subject of the method, while the method illustrated in this embodiment is described with the server as an execution subject of the method. Therefore, for the solutions of the method and optional embodiments of the method illustrated in this embodiment, reference may be made to the above description of the solutions of the method illustrated in FIG. 1 and optional embodiments of the method illustrated in FIG. 1, and details thereof will not be elaborated here.

In this embodiment, the server may determine, based on the identification information in the video obtaining request, the at least one second video each having a video similarity satisfying the first predetermined condition with the first video, and transmit to the terminal device the at least one second video and the second video preview information corresponding to the at least one second video, such that the user can operate on the second video preview information to play a corresponding second video. In this case, a second video can be directly pushed to the user even if the user does not actively select the second video, and thus videos having no characteristics in video covers thereof can be actively pushed to the user, thereby solving the problem that videos having no characteristics in video covers thereof cannot be pushed to the user. Also, since the present disclosure can ensure that videos recommended in the inner stream are videos that meet the user's intention, the accuracy of video push is improved.

Figure 5:
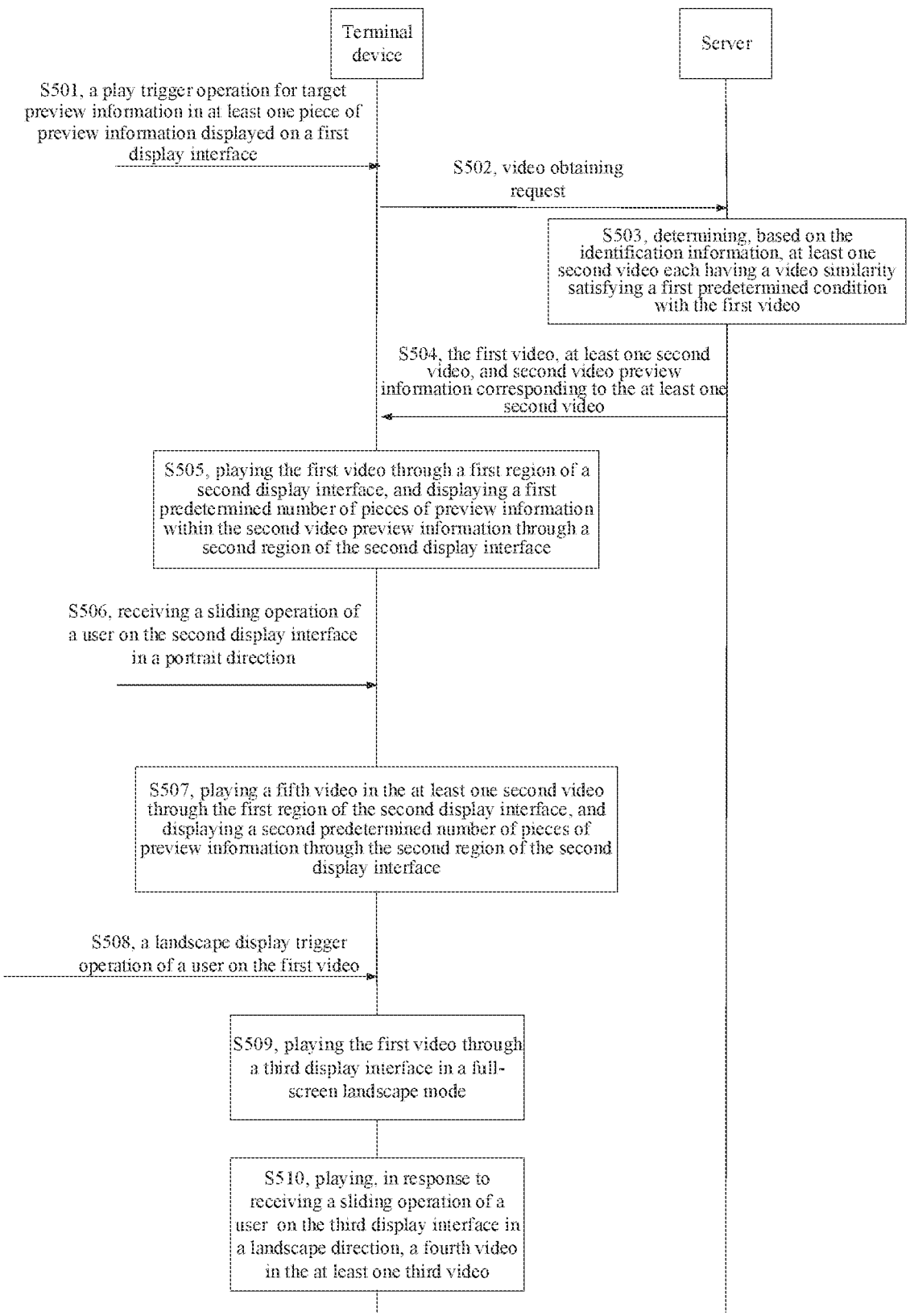
FIG. 5 is a schematic diagram showing yet another embodiment of a video recommendation method of the present disclosure.

Referring to FIG. 5, the solutions of the present disclosure will be described below from a perspective of interactions between the terminal device and the server.

In step S501, a terminal device receives from a user a play trigger operation for target preview information in at least one piece of preview information displayed on a first display interface.

In step S502, the terminal device transmits a video obtaining request to a server, wherein the video obtaining request carries identification information of a first video corresponding to the target preview information.

In step S503, the server determines, based on the identification information, at least one second video each having a video similarity satisfying a first predetermined condition with the first video.

In step S504, the server transmits to the terminal device the first video, the at least one second video, and second video preview information corresponding to the at least one second video.

In step S505, the terminal device plays the first video through a first region of a second display interface, and displays a first predetermined number of pieces of preview information within the second video preview information through a second region of the second display interface.

Subsequently, on the basis of different user operations, there may be two possible situations.

In step S506, the terminal device receives a sliding operation of a user on the second display interface in a portrait direction; and in step S507, the terminal device plays a fifth video in the at least one second video through the first region of the second display interface, and displays a second predetermined number of pieces of preview information through the second region of the second display interface.

Alternatively, in step S508, a landscape display trigger operation of a user on the first video is received; in step S509, the first video is played through a third display interface in a full-screen landscape mode; and in step S510, a fourth video in the at least one third video is played in response to receiving a sliding operation of the user on the third display interface in a landscape direction.

It should be noted that the method illustrated in this embodiment is essentially the same technical solution as the above method illustrated in FIG. 1 or FIG. 4. Therefore, for the method illustrated in this embodiment, reference may be made to the above description of solutions of the method illustrated in FIG. 1 or FIG. 4 and optional embodiments of the method illustrated in FIG. 1 or FIG. 4. For effects implemented by the method illustrated in this embodiment, reference may also be made to the description of the technical effects of the method illustrated in FIG. 1 or FIG. 4, and details thereof will not be elaborated here.

Figure 6:
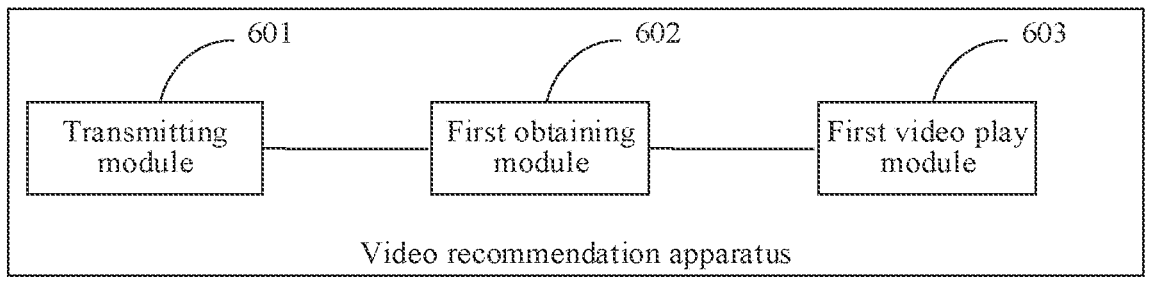
FIG. 6 is a schematic diagram showing a structure of a video recommendation apparatus of the present disclosure.

FIG. 6 is a schematic diagram showing a structure of a video recommendation apparatus according to an embodiment of the present disclosure. As illustrated in FIG. 6, an apparatus according to the embodiment of the present disclosure can include a transmitting module 601, a first obtaining module 602, and a first video play module 603.

The transmitting module 601 is configured to transmit a video obtaining request to a server in response to receiving a play trigger operation for target preview information in at least one piece of preview information displayed on a first display interface, wherein the video obtaining request carries identification information of a first video corresponding to the target preview information.

The first obtaining module 602 is configured to receive from the server the first video, at least one second video each having a video similarity satisfying a first predetermined condition with the first video, and second video preview information corresponding to the at least one second video.

The first video play module 603 is configured to play the first video through a first region of a second display interface, and display a first predetermined number of pieces of preview information within the second video preview information through a second region of the second display interface, wherein the second display interface includes the first region and the second region.

According to embodiments of the present disclosure, the apparatus further includes the following modules for performing actions after the first video play module 603 plays the first video through the first region of the second display interface; a second video play module configured to play, in response to receiving a landscape display trigger operation for the first video, the first video through a third display interface in a full-screen landscape mode; and a second obtaining module configured to obtain at least one third video satisfying a landscape play condition.

According to embodiments of the present disclosure, the second obtaining module is specifically configured to perform at least one of the following actions after obtaining the at least one third video satisfying the landscape play condition: determining the at least one third video satisfying the landscape play condition by screening from the obtained at least one second video; or transmitting landscape play prompt information to the server, and receiving the at least one third video satisfying the landscape play condition, the at least one third video satisfying the landscape play condition being determined by the server screening from all of the at least one second video based on the landscape play prompt information. The at least one third video satisfying the landscape play condition includes at least one of: a video having a video size ratio satisfying a predetermined landscape play size ratio; a video of a video type suitable for landscape play; or a video determined based on a history record of at least one video played in a landscape mode and watched by at least one user. The history record of at least one video played in the landscape mode includes at least one of: a time length for playing the at least one video in the landscape mode, a completion degree of playing the at least one video in the landscape mode, an operation of sliding to a landscape play interface of a next video in a landscape play mode, or a landscape display trigger operation on the at least one video.

According to embodiments of the present disclosure, the apparatus further includes the following modules for performing actions after the second obtaining module obtains the at least one third video satisfying the landscape play condition: a first determining module configured to determine a fourth video from the at least one third video in response to receiving a sliding operation of a user on the third display interface in a landscape direction; and a third video play module configured to play the fourth video through the third display interface in a full-screen landscape mode.

According to embodiments of the present disclosure, the at least one second video is at least two second videos, and the apparatus further includes the following modules for performing action after the first video play module 603 displays the first predetermined number of pieces of preview information within the second video preview information through the second region of the second display interface: a second determining module configured to; in response to receiving a sliding operation of a user on the second display interface in a portrait direction, determine a fifth video from the at least two second videos, and determine a second predetermined number of pieces of preview information from the second video preview information; and a fourth video play module configured to play the fifth video through the first region of the second display interface, and display the second predetermined number of pieces of preview information through the second region of the second display interface.

Figure 7:
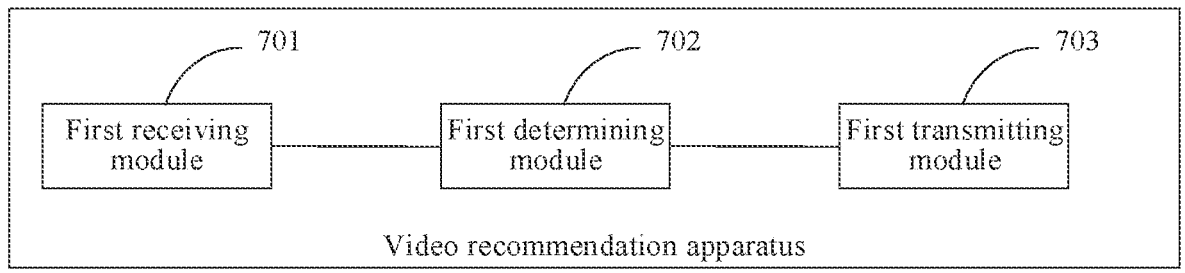
FIG. 7 is a schematic diagram showing another structure of a video recommendation apparatus of the present disclosure.

FIG. 7 is a schematic diagram showing a structure of a video recommendation apparatus provided by an embodiment of the present disclosure. As illustrated in FIG. 7, the apparatus according to the embodiment of the present disclosure may include a first receiving module 701, a first determining module 702, and a first transmitting module 703.

The first receiving module 701 is configured to receive a video obtaining request transmitted by a terminal device, wherein the video obtaining request is generated in response to a play trigger operation for target preview information in at least one piece of preview information displayed on a first display interface, and the video obtaining request carries identification information of a first video corresponding to the target preview information.

The first determining module 702 is configured to determine, based on the identification information, at least one second video each having a video similarity satisfying a first predetermined condition with the first video.

The first transmitting module 703 is configured to transmit the at least one second video and second video preview information corresponding to the at least one second video to the terminal device.

According to embodiments of the present disclosure, the first determining module 702 is specifically configured to, when determining, based on the identification information, the at least one second video each having the video similarity satisfying the first predetermined condition with the first video: determine the first video based on the identification information; calculate, based on coordinates in a similarity algorithm model of the first video and respective videos in a pre-stored video database, video similarities between the first video and the respective videos; and determine from the video database, based on the video similarities, the at least one second video each having the video similarity satisfying the first predetermined condition with the first video.

According to embodiments of the present disclosure, the at least one second video is at least two second videos, and the first transmitting module 703 is specifically configured to, when transmitting the at least two second videos and the second video preview information corresponding to the at least two second videos to the terminal device: transmit to the terminal device the at least two second videos that have been ranked based on a video type preference of a user and second video preview information corresponding to the at least two second videos, wherein the video type preference of the user is determined based on at least one of attribute information of the user or a history record of at least one video watched by the user. The apparatus further includes the following modules for performing actions after the first transmitting module 703 transmits the at least one second video and the second video preview information corresponding to the at least one second video to the terminal device: a first obtaining module configured to obtain a time length of the user watching the at least one second video; and a second determining module configured to determine a sum of the time length of the user watching the at least one second video and a time length of the user watching the first video as a watching time length of the first video, a ranking result of videos of a same video type as the first video being determined based on the watching time length.

According to embodiments of the present disclosure, the apparatus further includes the following modules for performing actions after the first receiving module 701 receives the video obtaining request transmitted by the terminal device: a second transmitting module configured to determine the first video based on the identification information in the video obtaining request, and transmit the first video to the terminal device; a second receiving module configured to receive landscape play prompt information transmitted by the terminal device, wherein the landscape play prompt information is generated by the terminal device in response to a landscape display trigger operation of a user on the first video; a third determining module configured to determine at least one third video satisfying a landscape play condition from the at least one second video based on the landscape play prompt information; and a third transmitting module configured to transmit the at least one third video to the terminal device. The at least one third video satisfying the landscape play condition includes at least one of: a video having a video size ratio satisfying a predetermined landscape play size ratio; a video of a video type suitable for landscape play; or a video determined based on a history record of at least one video played in a landscape mode and watched by at least one user. The history record of at least one video played in the landscape mode includes at least one of: a time length for playing the at least one video in the landscape mode, a completion degree of playing the at least one video in the landscape mode, an operation of sliding to a landscape play interface of a next video in a landscape play mode, or a landscape display trigger operation on the at least one video.

According to embodiments of the present disclosure, the at least one third video is at least two third videos, and the third transmitting module is specifically configured to, when transmitting the at least one third video to the terminal device: transmit to the terminal device the at least two third videos that have been ranked based on a video type preference of the user, wherein the video type preference of the user is determined based on at least one of attribute information of the user or a history record of at least one video watched by the user. The apparatus further includes the following modules for performing actions after the third transmitting module transmits the at least one third video to the terminal device: a second obtaining module configured to obtain a time length of the user watching the at least one third video; and a fourth determining module configured to determine a sum of the time length of the user watching the at least one third video and a time length of the user watching the first video as a watching time length of the first video, a ranking result of videos of a same video type as the first video being determined based on the watching time length.

According to embodiments of the present disclosure, the apparatus further includes the following modules for performing actions after the first transmitting module 703 transmits the at least one second video and the second video preview information corresponding to the at least one second video to the terminal device: a fifth determining module configured to determine, from videos corresponding to respective pieces of preview information that are displayed on the first display interface, a video that has not been played on a second display interface; and a fourth transmitting module configured to transmit the video that has not been played to the terminal device.

Figure 8:
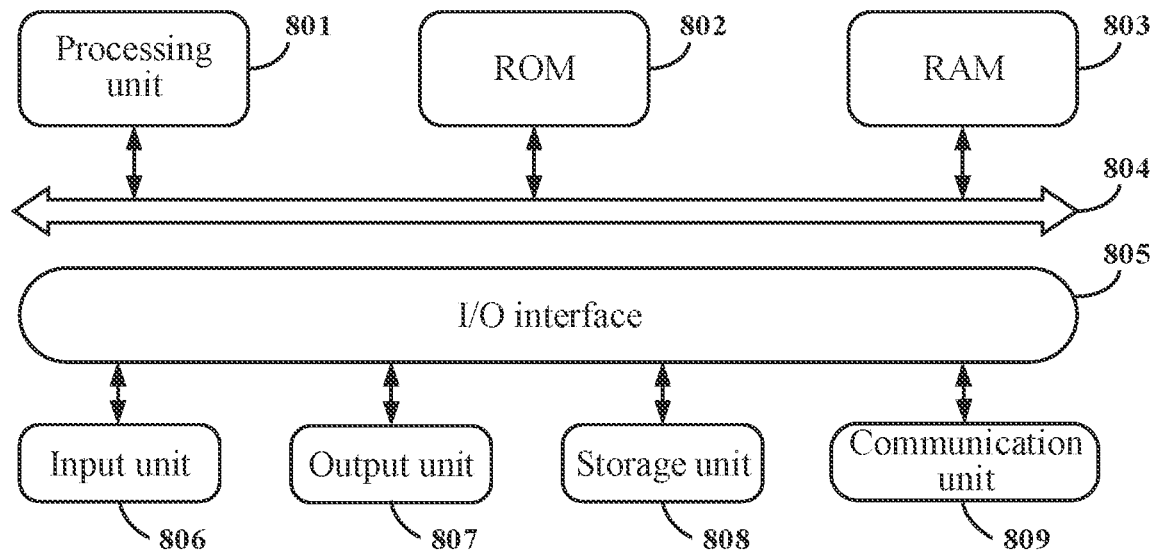
FIG. 8 is a schematic diagram showing a structure of an electronic device of the present disclosure.

Reference is now made to FIG. 8, which is a schematic diagram showing a structure of an electronic device (e.g., the terminal device in FIG. 1 or the server in FIG. 4) adapted to implement the embodiments of the present disclosure. The terminal device according to the embodiments of the present disclosure may include, but are not limited to, mobile terminals such as a mobile phone, a laptop computer, a digital broadcast receiver, a Personal Digital Assistant (PDA), a tablet computer or PAD, a Portable Multimedia Player (PMP), an on-vehicle terminal (e.g., an on-vehicle navigation terminal), etc., and fixed terminals such as a digital TV, a desktop computer, etc. The electronic device illustrated in FIG. 8 is exemplary only, and should not be construed as limiting the function and scope of use of the embodiments of the present disclosure.

The electronic device includes a memory and a processor. Here, the processor may be referred to as a processing unit 801 described below, and the memory may include at least one of a Read Only Memory (ROM) 802, a Random Access Memory (RAM) 803, or a storage unit 808 that are described below. Specific details are described below.

As illustrated in FIG. 8, the electronic device 800 may include a processing unit (such as a central processing unit, a graphics processing unit, etc.) 801, which may perform various appropriate actions and processes in accordance with programs stored in an ROM 802 or loaded from a storage unit 808 into an RAM 803. In the RAM 803, various programs and data required for operation of the electronic device 800 may also be stored. The processing unit 801, the ROM 802, and the RAM 803 are connected to each other through a bus 804. An Input/Output (I/O) interface 805 is also connected to the bus 804.

Generally, the following units may be connected to the I/O interface 805: an input unit 806 including, for example, a touch screen, a touch pad, a keyboard, a mouse, a camera, a microphone, an accelerometer, a gyroscope, etc.; an output unit 807 including, for example, a Liquid Crystal Display (LCD), a speaker, an oscillator, etc.; the storage unit 808 including, for example, a magnetic tape or a hard disk; and a communication unit 809. The communication unit 809 may allow the electronic device 800 to perform wireless or wired communication with other devices for data exchange. Although FIG. 8 illustrates the electronic device 800 having various units, it can be appreciated that it is not necessary to implement or provide all the illustrated units. Alternatively, more or fewer units may be implemented or provided.

In particular, according to embodiments of the present disclosure, the processes described above with reference to the flowcharts may be implemented as computer software programs. For example, an embodiment of the present disclosure includes a computer program product, which includes a computer program carried on a non-transient computer-readable medium. The computer program includes program codes for implementing the method illustrated in any of the flowcharts. In these embodiments, the computer program may be downloaded and installed from a network through the communication unit 809, or installed from the storage unit 808, or installed from the ROM 802. When the computer program is executed by the processing unit 801, the above-mentioned functions defined in the methods according to the embodiments of the present disclosure are performed.

It is to be noted that the above computer-readable medium in the present disclosure may be a computer-readable signal medium or a computer-readable storage medium or any combination thereof. The computer-readable storage medium may be, but not limited to, for example, an electrical, magnetic, optical, electromagnetic, infrared, or semiconductor system, apparatus, or device, or any combination thereof. More specific examples of the computer-readable storage medium may include, but are not limited to: an electrical connection having one or more wires, a portable computer disk, a hard disk, an RAM, an ROM, an Erasable Programmable Read Only Memory (EPROM) or a flash memory, an optical fiber, a Compact Disc Read-Only Memory (CD-ROM), an optical memory device, a magnetic memory device, or any suitable combination thereof. In the present disclosure, the computer-readable storage medium may be any tangible medium including or storing programs, which may be used by or used with an instruction execution system, apparatus, or device. However, in the present disclosure, the computer-readable signal medium may include a data signal propagated in a baseband or as a part of a carrier and carrying computer-readable program codes. Such propagated data signal may be in various forms, including but not limited to an electromagnetic signal, an optical signal, or any suitable combination thereof. The computer-readable signal medium may be any computer-readable medium other than the computer-readable storage medium, and may transmit, propagate, or transfer programs used by or used with an instruction execution system, apparatus or device. The program codes contained on the computer-readable medium may be transmitted via any appropriate medium, including but not limited to electric cable, optical cable, Radio Frequency (RF), or any suitable combination thereof.

In some embodiments, the client and the server can communicate using any currently-known or future-developed network protocol, such as HyperText Transfer Protocol (HTTP), and can be in interconnection communication with digital data in any form or medium (e.g., a communication network). Examples of communication networks include a Local Area Network (LAN), a Wide Area Network (WAN), the Internet work (e.g., the Internet), and an end-to-end network (e.g., ad hoc end-to-end network), as well as any currently-known or future-developed network.

The above computer-readable medium may be included in the above electronic device; or may be present independently without being assembled into the electronic device.

The above computer-readable medium may carry one or more programs which, when executed by the electronic device, causes the electronic device to: transmit a video obtaining request to a server in response to receiving a play trigger operation for target preview information in at least one piece of preview information displayed on a first display interface, wherein the video obtaining request carries identification information of a first video corresponding to the target preview information; receive from the server the first video, at least one second video each having a video similarity satisfying a first predetermined condition with the first video, and second video preview information corresponding to the at least one second video; and play the first video through a first region of a second display interface, and display a first predetermined number of pieces of preview information within the second video preview information through a second region of the second display interface, wherein the second display interface includes the first region and the second region.

Alternatively, the above computer-readable medium may carry one or more programs which, when executed by the electronic device, causes the electronic device to: receive a video obtaining request transmitted by a terminal device, wherein the video obtaining request is generated in response to a play trigger operation for target preview information in at least one piece of preview information displayed on a first display interface, and the video obtaining request carries identification information of a first video corresponding to the target preview information; determine, based on the identification information, at least one second video each having a video similarity satisfying a first predetermined condition with the first video; and transmit the at least one second video and second video preview information corresponding to the at least one second video to the terminal device.

The computer program codes for implementing the operations according to the present disclosure may be written in one or more programming languages or any combination thereof. The programming languages may include but are not limited to object-oriented programming languages, such as Java, Smalltalk, or C++, as well as conventional procedure-oriented programming languages, such as "C" language or similar programming languages. The program codes may be executed completely on a user computer, partly on the user computer, as a standalone software package, partly on the user computer and partly on a remote computer, or completely on a remote computer or server. In a case where the remote computer is involved, the remote computer may be connected to the user computer through any types of networks, including a Local Area Network (LAN) or a Wide Area Network (WAN), or to an external computer (e.g., over the Internet by using an Internet service provider).

The flowcharts and block diagrams in the figures illustrate architectures, functions, and operations of possible implementations of systems, methods and computer program products according to various embodiments of the present disclosure. In this regard, each block in the flowcharts or block diagrams may represent a module, a program segment, or a part of codes. The module, program segment, or part of codes may contain one or more executable instructions for implementing a specified logical function. It is also to be noted that, in some alternative implementations, functions showed in blocks may occur in a different order from the order shown in the figures. For example, two blocks illustrated in succession may actually be executed substantially in parallel with each other, or sometimes even in a reverse order, depending on functions involved. It is also to be noted that each block in the block diagrams and/or flowcharts, or any combination of the blocks in the block diagrams and/or flowcharts, may be implemented using a dedicated hardware-based system that is configured to perform specified functions or operations or using a combination of dedicated hardware and computer instructions.

Modules or units involved and described in the embodiments of the present disclosure can be implemented in software or hardware. Here, a name of a module or a unit does not constitute a limitation on the module or the unit itself under certain circumstances. For example, a first transmitting module can also be described as "a module that transmits a video obtaining request to a server".

The functions described above may be performed, at least in part, by one or more hardware logic components. For example, without limitation, exemplary types of suitable hardware logic components include a Field Programmable Gate Array (FPGA), an Application Specific Integrated Circuit (ASIC), an Application Specific Standard Product (ASSP), a System on Chip (SOC), a Complex Programmable Logic Device (CPLD), and the like.

In the context of this disclosure, a machine-readable medium may be a tangible medium, which may contain or store a program for use by or in connection with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination thereof. More specific examples of a machine-readable storage medium include an electrical connection having one or more wires, a portable computer disk, a hard disk, a Random Access Memory (RAM), a Read Only Memory (ROM), an Erasable Programmable Read Only Memory (EPROM) or flash memory, an optical fiber, a Compact Disc Read Only Memory (CD-ROM), an optical memory device, a magnetic memory device, or any suitable combination thereof.

According to one or more embodiments of the present disclosure, a video recommendation method is provided. The method includes: transmitting a video obtaining request to a server in response to receiving a play trigger operation for target preview information in at least one piece of preview information displayed on a first display interface, wherein the video obtaining request carries identification information of a first video corresponding to the target preview information; receiving, from the server, the first video, at least one second video each having a video similarity satisfying a first predetermined condition with the first video, and second video preview information corresponding to the at least one second video; and playing the first video through a first region of a second display interface, and displaying a first predetermined number of pieces of preview information within the second video preview information through a second region of the second display interface, wherein the second display interface includes the first region and the second region.

According to embodiments of the present disclosure, the method further includes, subsequent to playing the first video through the first region of the second display interface: playing, in response to receiving a landscape display trigger operation for the first video, the first video through a third display interface in a full-screen landscape mode; and obtaining at least one third video satisfying a landscape play condition.

According to embodiments of the present disclosure, obtaining the at least one third video satisfying the landscape play condition includes at least one of: determining the at least one third video satisfying the landscape play condition by screening from the obtained at least one second video; or transmitting landscape play prompt information to the server, and receiving the at least one third video satisfying the landscape play condition, the at least one third video satisfying the landscape play condition being determined by the server screening from the at least one second video based on the landscape play prompt information. The at least one third video satisfying the landscape play condition includes at least one of: a video having a video size ratio satisfying a predetermined landscape play size ratio; a video of a video type suitable for landscape play; or a video determined based on a history record of at least one video played in a landscape mode and watched by at least one user, wherein the history record of at least one video played in the landscape mode includes at least one of: a time length for playing the at least one video in the landscape mode, a completion degree of playing the at least one video in the landscape mode, an operation of sliding to a landscape play interface of a next video in a landscape play mode, or a landscape display trigger operation on the at least one video.

According to embodiments of the present disclosure, the method further includes, subsequent to obtaining the at least one third video satisfying the landscape play condition: determining a fourth video from the at least one third video in response to receiving a sliding operation of a user on the third display interface in a landscape direction; and playing the fourth video through the third display interface in a full-screen landscape mode.

According to embodiments of the present disclosure, the at least one second video is at least two second videos, and the method further includes, subsequent to displaying the first predetermined number of pieces of preview information within the second video preview information through the second region of the second display interface: in response to receiving a sliding operation of a user on the second display interface in a portrait direction, determining a fifth video from the at least two second videos, and determining a second predetermined number of pieces of preview information from the second video preview information; and playing the fifth video through the first region of the second display interface, and displaying the second predetermined number of pieces of preview information through the second region of the second display interface.

According to one or more embodiments of the present disclosure, a video recommendation method is further provided. The method includes; receiving a video obtaining request transmitted by a terminal device, wherein the video obtaining request is generated in response to a play trigger operation for target preview information in at least one piece of preview information displayed on a first display interface, and the video obtaining request carries identification information of a first video corresponding to the target preview information; determining, based on the identification information, at least one second video each having a video similarity satisfying a first predetermined condition with the first video; and transmitting the at least one second video and second video preview information corresponding to the at least one second video to the terminal device.

According to embodiments of the present disclosure, determining, based on the identification information, the at least one second video each having the video similarity satisfying the first predetermined condition with the first video includes: determining the first video based on the identification information; calculating, based on coordinates in a similarity algorithm model of the first video and respective videos in a pre-stored video database, video similarities between the first video and the respective videos; and determining from the pre-stored video database, based on the video similarities, the at least one second video each having the video similarity satisfying the first predetermined condition with the first video.

According to embodiments of the present disclosure, the at least one second video is at least two second videos, and transmitting the at least one second video and the second video preview information corresponding to the at least one second video to the terminal device includes: transmitting to the terminal device the at least two second videos that have been ranked based on a video type preference of a user and second video preview information corresponding to the at least two second videos, wherein the video type preference of the user is determined based on at least one of attribute information of the user or a history record of at least one video watched by the user. The method further includes, subsequent to transmitting the at least one second video and the second video preview information corresponding to the at least one second video to the terminal device: obtaining a time length of the user watching the at least one second video; and determining a sum of the time length of the user watching the at least one second video and a time length of the user watching the first video as a watching time length of the first video, a ranking result of videos of a same video type as the first video being determined based on the watching time length.

According to embodiments of the present disclosure, the method further includes, subsequent to receiving the video obtaining request transmitted by the terminal device: determining the first video based on the identification information in the video obtaining request, and transmitting the first video to the terminal device; receiving landscape play prompt information transmitted by the terminal device, wherein the landscape play prompt information is generated by the terminal device in response to a landscape display trigger operation of a user on the first video; determining at least one third video satisfying a landscape play condition from the at least one second video based on the landscape play prompt information; and transmitting the at least one third video to the terminal device. The at least one third video satisfying the landscape play condition includes at least one of: a video having a video size ratio satisfying a predetermined landscape play size ratio; a video of a video type suitable for landscape play; or a video determined based on a history record of at least one video played in a landscape mode and watched by at least one user, wherein the history record of at least one video played in the landscape mode includes at least one of: a time length for playing the at least one video in the landscape mode, a completion degree of playing the at least one video in the landscape mode, an operation of sliding to a landscape play interface of a next video in a landscape play mode, or a landscape display trigger operation on the at least one video.

According to embodiments of the present disclosure, the at least one third video is at least two third videos, and transmitting the at least one third video to the terminal device includes: transmitting to the terminal device the at least two third videos that have been ranked based on a video type preference of the user, wherein the video type preference of the user is determined based on at least one of attribute information of the user or a history record of at least one video watched by the user. The method further includes, subsequent to transmitting the at least one third video to the terminal device: obtaining a time length of the user watching the at least one third video; and determining a sum of the time length of the user watching the at least one third video and a time length of the user watching the first video as a watching time length of the first video, a ranking result of videos of a same video type as the first video being determined based on the watching time length.

According to embodiments of the present disclosure, the method further includes, subsequent to transmitting the at least one second video and the second video preview information corresponding to the at least one second video to the terminal device: determining, from videos corresponding to respective pieces of preview information that are displayed on the first display interface, a video that has not been played on a second display interface; and transmitting the video that has not been played to the terminal device.

According to one or more embodiments of the present disclosure, a video recommendation apparatus is provided. The apparatus includes: a transmitting module configured to transmit a video obtaining request to a server in response to receiving a play trigger operation for target preview information in at least one piece of preview information displayed on a first display interface, wherein the video obtaining request carries identification information of a first video corresponding to the target preview information; a first obtaining module configured to receive, from the server, the first video, at least one second video each having a video similarity satisfying a first predetermined condition with the first video, and second video preview information corresponding to the at least one second video; and a first video play module configured to play the first video through a first region of a second display interface, and display a first predetermined number of pieces of preview information within the second video preview information through a second region of the second display interface, wherein the second display interface includes the first region and the second region.

According to embodiments of the present disclosure, the apparatus further includes the following modules for performing actions after the first video play module plays the first video through the first region of the second display interface: a second video play module configured to play, in response to receiving a landscape display trigger operation for the first video, the first video through a third display interface in a full-screen landscape mode; and a second obtaining module configured to obtain at least one third video satisfying a landscape play condition.

According to embodiments of the present disclosure, the second obtaining module is specifically configured to perform at least one of the following operations when obtaining the at least one third video satisfying the landscape play condition: determining the at least one third video satisfying the landscape play condition by screening from the obtained at least one second video; or transmitting landscape play prompt information to the server, and receiving the at least one third video satisfying the landscape play condition, the at least one third video satisfying the landscape play condition being determined by the server screening from the at least one second video based on the landscape play prompt information. The at least one third video satisfying the landscape play condition includes at least one of: a video having a video size ratio satisfying a predetermined landscape play size ratio; a video of a video type suitable for landscape play; or a video determined based on a history record of at least one video played in a landscape mode and watched by at least one user, wherein the history record of at least one video played in the landscape mode includes at least one of: a time length for playing the at least one video in the landscape mode, a completion degree of playing the at least one video in the landscape mode, an operation of sliding to a landscape play interface of a next video in a landscape play mode, or a landscape display trigger operation on the at least one video.

According to embodiments of the present disclosure, the apparatus further includes the following modules for performing operations after the second obtaining module obtains the at least one third video satisfying the landscape play condition: a first determining module configured to determine a fourth video from the at least one third video in response to receiving a sliding operation of a user on the third display interface in a landscape direction; and a third video play module configured to play the fourth video through the third display interface in a full-screen landscape mode.

According to embodiments of the present disclosure, the at least one second video is at least two second videos, and the apparatus further includes the following modules for performing operations after the first video play module displays the first predetermined number of pieces of preview information within the second video preview information through the second region of the second display interface: a second determining module configured to: in response to receiving a sliding operation of a user on the second display interface in a portrait direction, determine a fifth video from the at least two second videos, and determine a second predetermined number of pieces of preview information from the second video preview information; and a fourth video play module configured to play the fifth video through the first region of the second display interface, and display the second predetermined number of pieces of preview information through the second region of the second display interface.

According to one or more embodiments of the present disclosure, a video recommendation apparatus is further provided. The apparatus includes: a first receiving module configured to receive a video obtaining request transmitted by a terminal device, wherein the video obtaining request is generated in response to a play trigger operation for target preview information in at least one piece of preview information displayed on a first display interface, and the video obtaining request carries identification information of a first video corresponding to the target preview information; a first determining module configured to determine, based on the identification information, at least one second video each having a video similarity satisfying a first predetermined condition with the first video; and a first transmitting module configured to transmit the at least one second video and second video preview information corresponding to the at least one second video to the terminal device.

According to embodiments of the present disclosure, the first determining module is specifically configured to: when determining, based on the identification information, the at least one second video each having the video similarity satisfying the first predetermined condition with the first video, determine the first video based on the identification information; calculate, based on coordinates in a similarity algorithm model of the first video and respective videos in a pre-stored video database, video similarities between the first video and the respective videos; and determine from the video database, based on the video similarities, the at least one second video each having the video similarity satisfying the first predetermined condition with the first video.

According to embodiments of the present disclosure, the at least one second video is at least two second videos, and the first transmitting module is specifically configured to: when transmitting the at least two second videos and second video preview information corresponding to the at least two second videos to the terminal device, transmit to the terminal device the at least two second videos that have been ranked based on a video type preference of a user and second video preview information corresponding to the at least two second videos, wherein the video type preference of the user is determined based on at least one of attribute information of the user or a history record of at least one video watched by the user. The apparatus further includes the following modules for performing operations after the first transmitting module transmits the at least one second video and the second video preview information corresponding to the at least one second video to the terminal device: a first obtaining module configured to obtain a time length of the user watching the at least one second video; and a second determining module configured to determine a sum of the time length of the user watching the at least one second video and a time length of the user watching the first video as a watching time length of the first video, a ranking result of videos of a same video type as the first video being determined based on the watching time length.

According to embodiments of the present disclosure, the apparatus further includes the following modules for performing operations after the first receiving module receives the video obtaining request transmitted by the terminal device: a second transmitting module configured to determine the first video based on the identification information in the video obtaining request, and transmit the first video to the terminal device; a second receiving module configured to receive landscape play prompt information transmitted by the terminal device, wherein the landscape play prompt information is generated by the terminal device in response to a landscape display trigger operation of a user on the first video; a third determining module configured to determine at least one third video satisfying a landscape play condition from the at least one second video based on the landscape play prompt information; and a third transmitting module configured to transmit the at least one third video to the terminal device. The at least one third video satisfying the landscape play condition includes at least one of: a video having a video size ratio satisfying a predetermined landscape play size ratio; a video of a video type suitable for landscape play; or a video determined based on a history record of at least one video played in a landscape mode and watched by at least one user, wherein the history record of at least one video played in the landscape mode includes at least one of: a time length for playing the at least one video in the landscape mode, a completion degree of playing the at least one video in the landscape mode, an operation of sliding to a landscape play interface of a next video in a landscape play mode, or a landscape display trigger operation on the at least one video.

According to embodiments of the present disclosure, the at least one third video is at least two third videos, and the third transmitting module is specifically configured to: when transmitting the at least one third video to the terminal device, transmit to the terminal device the at least two third videos that have been ranked based on a video type preference of the user, wherein the video type preference of the user is determined based on at least one of attribute information of the user or a history record of at least one video watched by the user. The apparatus further includes the following modules for performing operations after the third transmitting module transmits the at least one third video to the terminal device: a second obtaining module configured to obtain a time length of the user watching the at least one third video; and a fourth determining module configured to determine a sum of the time length of the user watching the at least one third video and a time length of the user watching the first video as a watching time length of the first video, a ranking result of videos of a same video type as the first video being determined based on the watching time length.

According to embodiments of the present disclosure, the apparatus further includes the following modules for performing operations after the first transmitting module transmits the at least one second video and the second video preview information corresponding to the at least one second video to the terminal device: a fifth determining module configured to determine, from videos corresponding to respective pieces of preview information that are displayed on the first display interface, a video that has not been played on a second display interface: and a fourth transmitting module configured to transmit the video that has not been played to the terminal device.

The above description is only intended to explain the preferred embodiments of the present disclosure and the employed principles of technology. It will be appreciated by those skilled in the art that the scope of the present disclosure herein is not limited to the technical solutions formed by the specific combinations of the above technical features, but should also encompass other technical solutions formed by any other combinations of features described above or equivalents thereof without departing from the above ideas of the present disclosure. For example, the above features and the technical features disclosed in the present disclosure having similar functions (but not limited to them) are replaced with each other to form the technical solution.

Further, although the operations are depicted in a specific order, this should not be understood as requiring these operations to be performed in the specific order illustrated or in a sequential order. Under certain circumstances, multitasking and parallel processing may be advantageous. Likewise, although several specific implementation details are included in the above discussion, these should not be construed as limitations on the scope of the present disclosure. Certain features that are described in the context of separate embodiments can also be implemented in combination in a single embodiment. Conversely, various features described in the context of a single embodiment can also be implemented in multiple embodiments separately or in any suitable combination. Although the subject matter has been described in language specific to structural features and/or logical actions of method, it should be understood that the subject matter defined in the appended claims is not necessarily limited to the specific features or actions described above. On the contrary, the specific features and actions described above are merely exemplary forms of implementing the claims.

What is claimed is:

1. A video recommendation method, comprising:
transmitting a video obtaining request to a server in response to receiving a play trigger operation for target video preview information in at least one piece of video preview information displayed on a first display interface, wherein the video obtaining request carries identification information of a first video corresponding to the target video preview information;
receiving, from the server, the first video, at least one second video each having a video similarity satisfying a first predetermined condition with the first video, and second video preview information corresponding to the at least one second video, the at least one second video each having the video similarity satisfying the first predetermined condition with the first video being determined from a pre-stored video database based on video similarities between the first video and respective videos in the pre-stored video database, the video similarities between the first video and the respective videos being calculated based on coordinates in a similarity algorithm model of the first video and the respective videos in the pre-stored video database; and
playing the first video through a first region of a second display interface, and displaying a first predetermined number of pieces of preview information in the second video preview information through a second region of the second display interface, wherein the second display interface comprises the first region and the second region,
wherein the method further comprises, subsequent to said playing the first video through the first region of the second display interface:
playing, in response to receiving a landscape display trigger operation for the first video, the first video through a third display interface in a full-screen landscape mode; and
obtaining at least one third video satisfying a landscape play condition,
wherein said obtaining the at least one third video satisfying the landscape play condition comprises at least one of:
determining the at least one third video satisfying the landscape play condition by screening from the obtained at least one second video; or
transmitting landscape play prompt information to the server, and receiving the at least one third video satisfying the landscape play condition, the at least one third video satisfying the landscape play condition being determined by the server screening from the at least one second video based on the landscape play prompt information, and
wherein the at least one third video satisfying the landscape play condition comprises at least one of:
a video having a video size ratio satisfying a predetermined landscape play size ratio; or
a video determined based on a history record of at least one video played in a landscape mode and watched by at least one user, wherein the history record of at least one video played in the landscape mode comprises at least one of: a time length for playing the at least one video in the landscape mode, a completion degree of playing the at least one video in the landscape mode, an operation of sliding to a landscape play interface of a next video in a landscape play mode, or a landscape display trigger operation on the at least one video,
wherein subsequent to receiving from the server the at least one second video and the second video preview information corresponding to the at least one second video,
a time length of the user watching the at least one second video is obtained; and
a sum of the time length of the user watching the at least one second video and a time length of the user watching the first video is determined as a watching time length of the first video, and a ranking result of videos of a same video type as the first video is determined based on the watching time length, wherein the first display interface is a recommended video preview display interface, the first region of the second display interface is a video play region, the second region of the second display interface is a recommended video preview display region, the first region of the second display interface plays the first video corresponding to the target video preview information triggered in the first display interface, and at the same time, the second region of the second display interface displays the video preview information of the second video having the video similarity satisfying the first predetermined condition with the first video;

wherein the first display interface selects recommended videos based on a real-time video clout of each video, the real-time video clout being determined by at least one of a real-time browsing amount, a real-time forwarding amount, or a real-time sharing amount of the video, wherein the second display interface displays videos recommended based on the user's intention, and wherein both the first display interface and the second display interface are displayed in a full-screen mode on a terminal device.

2. The method according to claim 1, further comprising, subsequent to said obtaining the at least one third video satisfying the landscape play condition:

determining a fourth video from the at least one third video in response to receiving a sliding operation by a user on the third display interface in a landscape direction; and playing the fourth video through the third display interface in a full-screen landscape mode.

3. The method according to claim 1, wherein the at least one second video comprises at least two second videos, and the method further comprises, subsequent to said displaying the first predetermined number of pieces of preview information in the second video preview information through the second region of the second display interface:

in response to receiving a sliding operation of a user on the second display interface in a portrait direction, determining a fifth video from the at least two second videos, and determining a second predetermined number of pieces of preview information from the second video preview information; and playing the fifth video through the first region of the second display interface, and displaying the second predetermined number of pieces of preview information through the second region of the second display interface.

4. A video recommendation method, comprising:

receiving a video obtaining request transmitted by a terminal device, wherein the video obtaining request is generated in response to a play trigger operation for target video preview information in at least one piece of video preview information displayed on a first display interface, and the video obtaining request carries identification information of a first video corresponding to the target video preview information;

determining, based on the identification information, at least one second video each having a video similarity satisfying a first predetermined condition with the first video; and transmitting the at least one second video and second video preview information corresponding to the at least one second video to the terminal device, wherein said determining, based on the identification information, the at least one second video each having the video similarity satisfying the first predetermined condition with the first video comprises:

determining the first video based on the identification information;

calculating, based on coordinates in a similarity algorithm model of the first video and respective videos in a pre-stored video database, video similarities between the first video and the respective videos; and determining from the pre-stored video database, based on the video similarities, the at least one second video each having the video similarity satisfying the first predetermined condition with the first video, wherein the method further comprises, subsequent to said receiving the video obtaining request transmitted by the terminal device:

determining the first video based on the identification information in the video obtaining request, and transmitting the first video to the terminal device;

receiving landscape play prompt information transmitted by the terminal device, wherein the landscape play prompt information is generated by the terminal device in response to a landscape display trigger operation of a user on the first video;

determining at least one third video satisfying a landscape play condition from the at least one second video based on the landscape play prompt information; and transmitting the at least one third video to the terminal device, and wherein the at least one third video satisfying the landscape play condition comprises at least one of:

a video having a video size ratio satisfying a predetermined landscape play size ratio; or a video determined based on a history record of at least one video played in a landscape mode and watched by at least one user, wherein the history record of at least one video played in the landscape mode comprises at least one of: a time length for playing the at least one video in the landscape mode, a completion degree of playing the videos in the landscape mode, an operation of sliding to a landscape play interface of a next video in a landscape play mode, or a landscape display trigger operation on the at least one video, wherein the method further comprises, subsequent to said transmitting the at least one second video and the second video preview information corresponding to the at least one second video to the terminal device:

obtaining a time length of the user watching the at least one second video; and determining a sum of the time length of the user watching the at least one second video and a time length of the user watching the first video as a watching time length of the first video, a ranking result of videos of a same video type as the first video being determined based on the watching time length, wherein the first display interface is a recommended video preview display interface, a first region of a second display interface is a video play region, a second region of the second display interface is a recommended video preview display region, the first region of the second display interface plays the first video corresponding to the target video preview information triggered in the first display interface, and at the same time, the second region of the second display interface displays the video preview information of the second video having the video similarity satisfying the first predetermined condition with the first video;
wherein the first display interface selects recommended videos based on a real-time video clout of each video, the real-time video clout being determined by at least one of a real-time browsing amount, a real-time forwarding amount, or a real-time sharing amount of the video. wherein the second display interface displays videos recommended based on the user's intention, and wherein both the first display interface and the second display interface are displayed in a full-screen mode on the terminal device.

5. The method according to claim 4, wherein the at least one second video comprises at least two second videos, and said transmitting the at least one second video and the second video preview information corresponding to the at least one second video to the terminal device comprises:
transmitting to the terminal device the at least two second videos that have been ranked based on a video type preference of a user and second video preview information corresponding to the at least two second videos, wherein the video type preference of the user is determined based on at least one of attribute information of the user or a history record of at least one video watched by the user.

6. The method according to claim 4, wherein the at least one third video comprises at least two third videos, and said transmitting the at least one third video to the terminal device comprises:
transmitting to the terminal device the at least two third videos that have been ranked based on a video type preference of the user, wherein the video type preference of the user is determined based on at least one of attribute information of the user or a history record of at least one video watched by the user, and
wherein the method further comprises, subsequent to said transmitting the at least one third video to the terminal device:
obtaining a time length of the user watching the at least one third video; and
determining a sum of the time length of the user watching the at least one third video and a time length of the user watching the first video as a watching time length of the first video, a ranking result of videos of a same video type as the first video being determined based on the watching time length.

7. The method according to claim 4, further comprising, subsequent to said transmitting the at least one second video and the second video preview information corresponding to the at least one second video to the terminal device:
determining, from videos corresponding to respective pieces of preview information that are displayed on the first display interface, a video that has not been played on a second display interface; and
transmitting the video that has not been played to the terminal device.

8. An electronic device, comprising:
a memory having a computer program stored thereon; and
a processor configured to, when executing the computer program, implement the method according to claim 4.

9. The electronic device according to claim 8, wherein the at least one second video comprises at least two second videos, and said transmitting the at least one second video and the second video preview information corresponding to the at least one second video to the terminal device comprises:
transmitting to the terminal device the at least two second videos that have been ranked based on a video type preference of a user and second video preview information corresponding to the at least two second videos, wherein the video type preference of the user is determined based on at least one of attribute information of the user or a history record of at least one video watched by the user.

10. An electronic device, comprising:
a memory having a computer program stored thereon; and
a processor configured to, when executing the computer program, implement the method according to claim 1.

11. The electronic device according to claim 10, wherein the method further comprises, subsequent to said obtaining the at least one third video satisfying the landscape play condition:
determining a fourth video from the at least one third video in response to receiving a sliding operation by a user on the third display interface in a landscape direction; and
playing the fourth video through the third display interface in a full-screen landscape mode.

12. A non-transitory computer-readable storage medium having a computer program stored thereon, wherein the computer program, when executed by a processor, implements the method according to claim 1.

13. A non-transitory computer-readable storage medium having a computer program stored thereon, wherein the computer program, when executed by a processor, implements the method according to claim 4.

* * * * *